US008520570B2

(12) United States Patent
Nakata

(10) Patent No.: US 8,520,570 B2
(45) Date of Patent: Aug. 27, 2013

(54) DATA COMMUNICATION SYSTEM, INFORMATION PROCESSING APPARATUS AND STORAGE MEDIUM HAVING STORED THEREON INFORMATION PROCESSING PROGRAM

(75) Inventor: Satoru Nakata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 667 days.

(21) Appl. No.: 12/236,831

(22) Filed: Sep. 24, 2008

(65) Prior Publication Data
US 2009/0310594 A1 Dec. 17, 2009

(30) Foreign Application Priority Data

Jun. 17, 2008 (JP) ................................. 2008-158194
Jul. 15, 2008 (JP) ................................. 2008-183421

(51) Int. Cl.
*H04B 7/00* (2006.01)
(52) U.S. Cl.
USPC .......................................... 370/310; 370/350
(58) Field of Classification Search
USPC .......... 370/310, 350, 315, 252; 709/227–229
See application file for complete search history.

(56) References Cited

U.S. PATENT DOCUMENTS

| 5,391,918 | A | 2/1995 | Koyanagi et al. | |
|---|---|---|---|---|
| 5,497,455 | A | 3/1996 | Suga et al. | |
| 7,603,629 | B1 | 10/2009 | Crosswhite et al. | |
| 7,684,783 | B1 * | 3/2010 | Vacon et al. | 455/410 |
| 7,818,025 | B2 | 10/2010 | Zhao et al. | |
| 7,860,038 | B2 * | 12/2010 | Abhishek et al. | 370/311 |
| 2003/0058273 | A1 | 3/2003 | Keohane et al. | |
| 2005/0136909 | A1 | 6/2005 | Eguchi | |
| 2005/0188318 | A1 | 8/2005 | Tamir et al. | |
| 2005/0282573 | A1 * | 12/2005 | Maeno | 455/522 |
| 2005/0286456 | A1 * | 12/2005 | McNew et al. | 370/312 |

(Continued)

FOREIGN PATENT DOCUMENTS

| EP | 1 086 732 | 3/2001 |
|---|---|---|
| JP | 6-12208 | 1/1994 |

(Continued)

OTHER PUBLICATIONS

Extended European Search Report dated Aug. 14, 2009 issued in corresponding European Application No. 08014626.9.

(Continued)

*Primary Examiner* — Gary Mui
(74) *Attorney, Agent, or Firm* — Nixon & Vanderhye, P.C.

(57) ABSTRACT

Provided is a data communication system including a first communication terminal, a second communication terminal and a connection point apparatus. The first communication terminal includes connection point data transmitting means. The connection point data transmitting means transmits connection point data for communicating with the connection point apparatus. The second communication terminal includes connection point data receiving means and communication means. The connection point data receiving means attempts to the receive connection point data from the first communication terminal. The communication means attempts to communicate with the connection point apparatus by using the connection point data received by the connection point data receiving means.

27 Claims, 11 Drawing Sheets

(56) References Cited

U.S. PATENT DOCUMENTS

| | | |
|---|---|---|
| 2006/0023651 A1 | 2/2006 | Tsuchiuchi et al. |
| 2006/0056336 A1 | 3/2006 | Dacosta |
| 2006/0069769 A1 | 3/2006 | Dacosta |
| 2006/0107327 A1 | 5/2006 | Sprigg et al. |
| 2008/0119211 A1 | 5/2008 | Paas et al. |
| 2008/0176515 A1 | 7/2008 | Hiles |
| 2009/0063978 A1 | 3/2009 | Dawson et al. |
| 2009/0164923 A1 | 6/2009 | Ovi |
| 2009/0168689 A1* | 7/2009 | Itagaki et al. .................. 370/315 |
| 2009/0285484 A1* | 11/2009 | Mallinson et al. ............ 382/183 |
| 2010/0056161 A1* | 3/2010 | Matsumura ................... 455/445 |
| 2010/0261432 A1* | 10/2010 | Kohno et al. .............. 455/67.11 |
| 2010/0323682 A1 | 12/2010 | Hatayama et al. |

FOREIGN PATENT DOCUMENTS

| | | |
|---|---|---|
| JP | A-2000-76197 | 3/2000 |
| JP | 2005-33285 | 2/2005 |
| JP | 2005-192202 | 7/2005 |
| JP | 2005-227951 | 8/2005 |
| JP | 2006-42087 | 2/2006 |
| JP | 2007-142859 | 6/2007 |
| JP | 2008-512944 | 4/2008 |
| WO | 2005/086399 | 9/2005 |
| WO | 2008047475 | 4/2008 |

OTHER PUBLICATIONS

Sony Computer Entertainment PSP Instruction Manual, 2005, pp. 98-106, XP002539574.

Notice of Reasons for Rejection issued on Oct. 21, 2008 in corresponding JP Application No. 2008-158194.

Office Action (32 pgs.) dated Apr. 13, 2011 issued in co-pending U.S. Appl. No. 12/216,463.

Robbie Allen et al., Windows XP Cookbook, Publisher: O'Reilly Media, published on Aug. 8, 2005.

Office Action (18 pgs.) dated Sep. 19, 2011 issued in co-pending U.S. Appl. No. 12/216,463.

Chaks' Corner, "Things I Like in Vista-Network icon status" (Oct. 14, 2007), http://chakkaradeep.wordpress.com/2007/10/14/things-i-like-in-vista-network-icon-status/.

Office Action issued for U.S. Appl. No. 12/216,463, dated Jun. 21, 2012.

Japanese Office Action (Notice of Reasons for Rejection) issued for corresponding JP Patent Application No. 2008-183421, dated Dec. 18, 2012.

Office Action in U.S. Appl. No. 12/216,463 dated Mar. 20, 2013.

* cited by examiner

F I G. 2
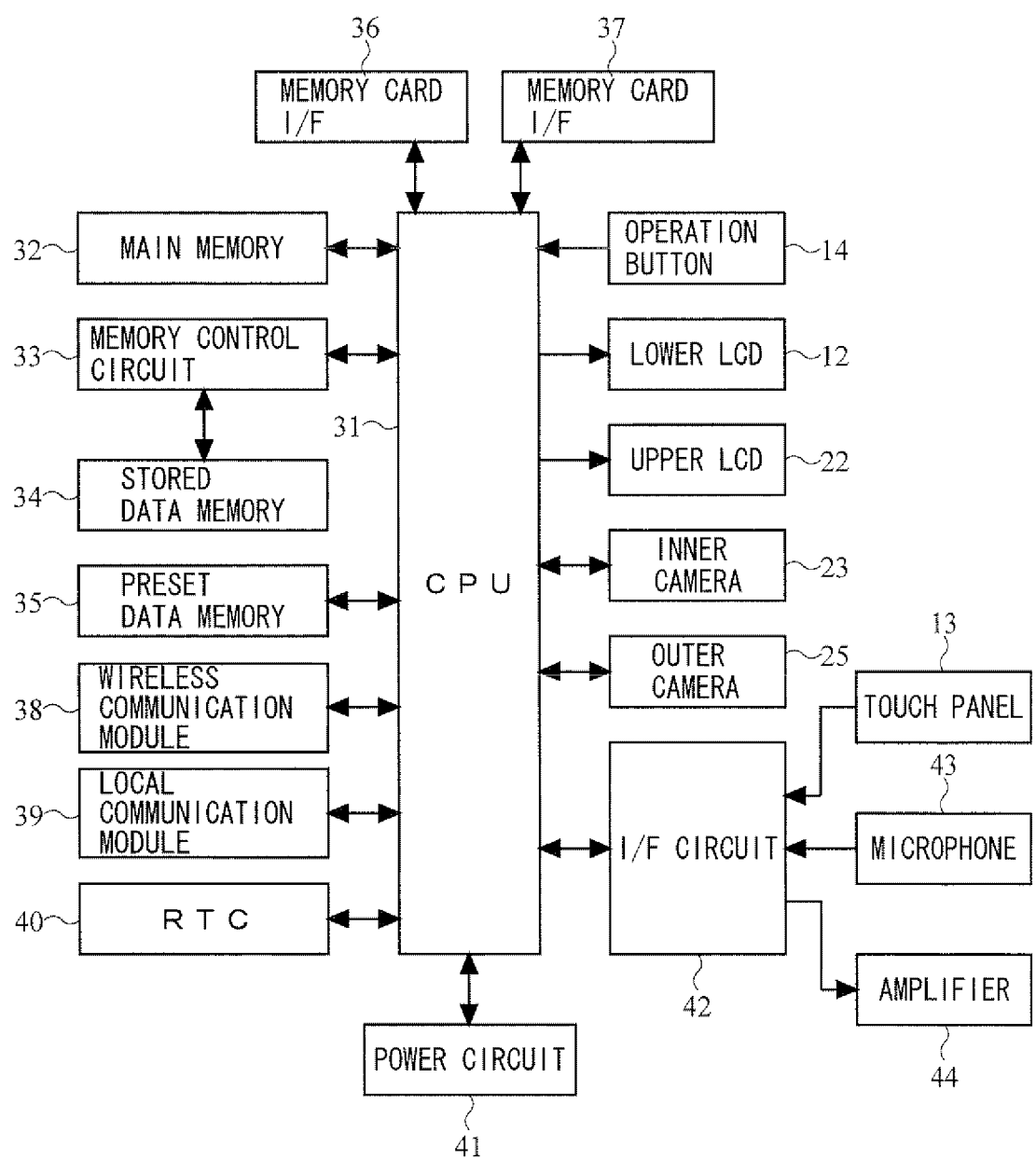

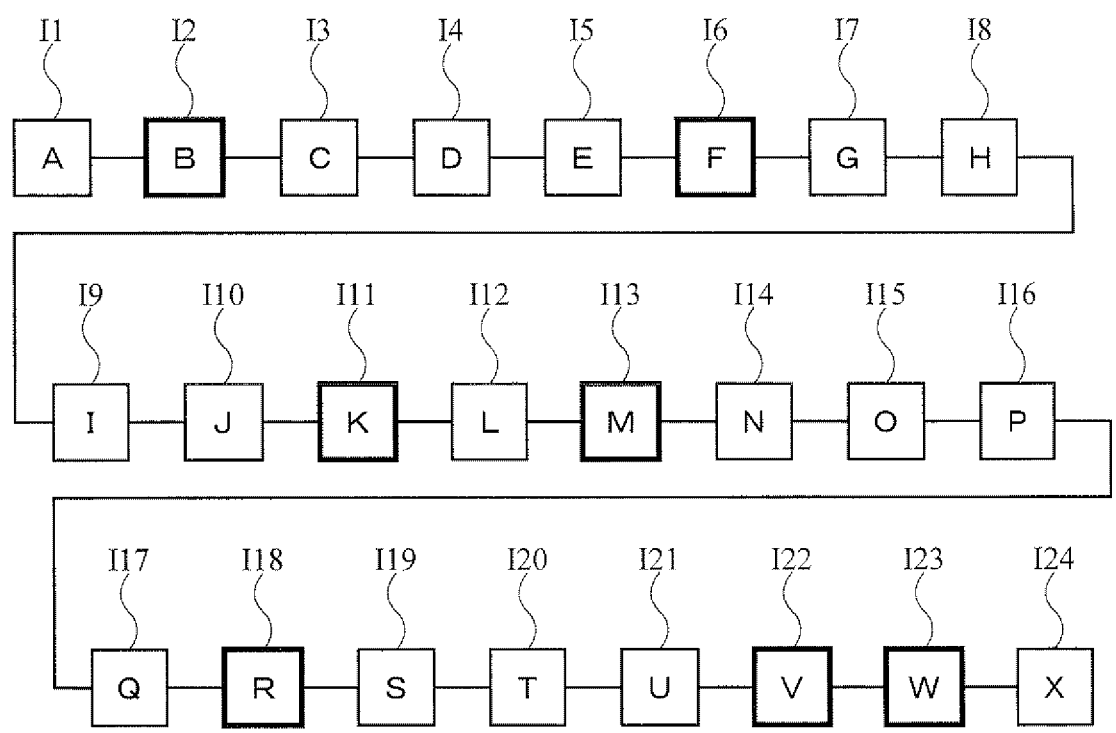
F I G. 4

F I G. 7
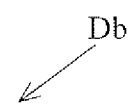

F I G. 1 0
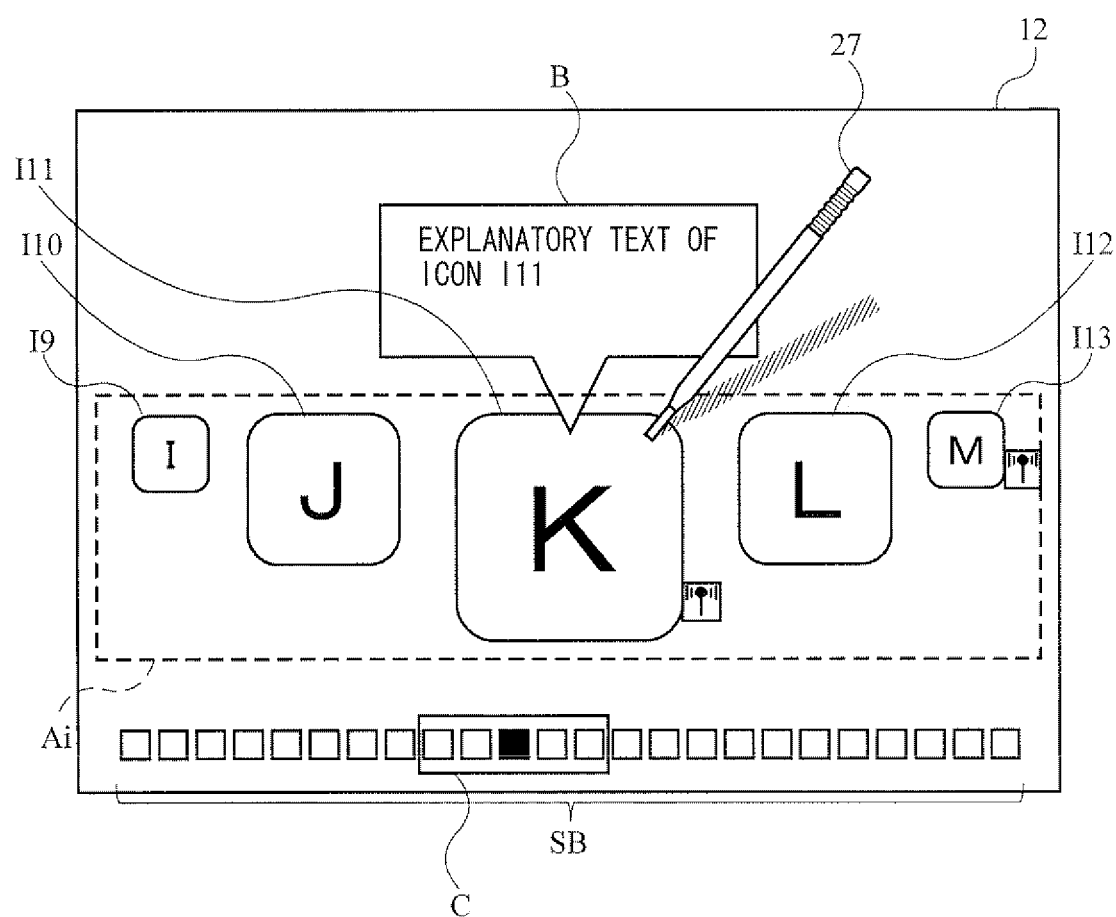

F I G. 1 1
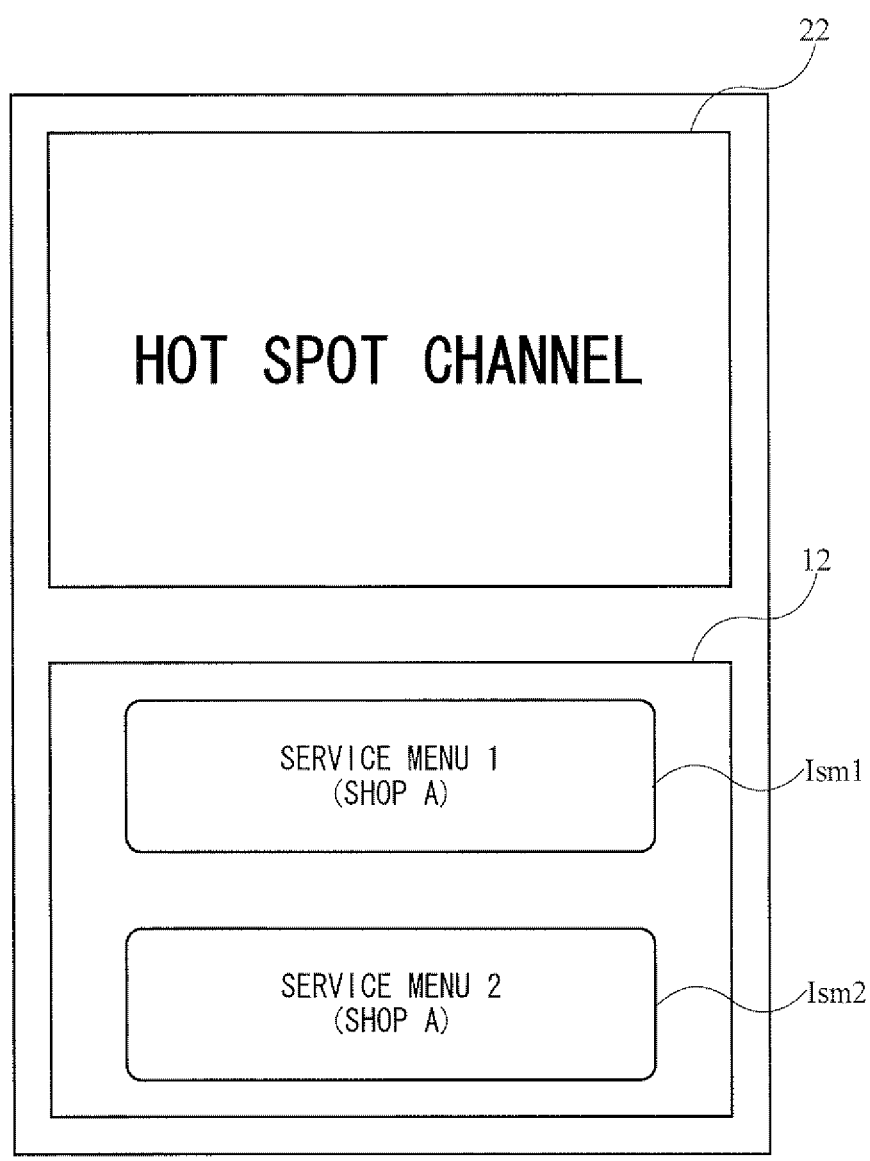

DATA COMMUNICATION SYSTEM, INFORMATION PROCESSING APPARATUS AND STORAGE MEDIUM HAVING STORED THEREON INFORMATION PROCESSING PROGRAM

CROSS REFERENCE TO RELATED APPLICATION

The disclosure of Japanese Patent Applications No 2008-158194 filed Jun. 17, 2008 and No. 2008-183421 filed Jul. 15, 2008 are incorporated herein by reference.

BACKGROUND

1. Field

Example embodiments of the present invention relate to a data communication system, an information processing apparatus and a storage medium having stored thereon an information processing program, and more particularly, the example embodiments of the present invention relate to a data communication system for communicating with a connection point apparatus such as a wireless access point, an information processing apparatus included in the data communication system, and a storage medium having stored thereon an information processing program executed on the information processing apparatus.

2. Description of the Background Art

Conventionally, there have been developed various apparatuses For establishing connection to a wide area network, such as the Internet, or a local network via a wireless LAN or the like. For example, Japanese Laid-Open Patent Publication No. 2005-33285 (hereinafter referred to as Patent document 1) discloses a wireless information terminal which is connected to a wireless access point via a wireless communication line and a wireless communication system including the wireless information terminal. When a user having the wireless information terminal is to select a wireless access point desired to be connected, the wireless information terminal and the wireless communication system disclosed in above-described Patent document 1 provide the user with congestion information and information on received electric field strength, whereby the user selects an optimal wireless access point.

However, according to the wireless information terminal and the wireless communication system, which are disclosed in above-described Patent document 1, the congestion information and other pieces of information such as an SSID (Service Set Identifier) are included in a beacon signal transmitted from a wireless access point to be connected. Therefore, the user of the wireless information terminal can establish connection to a wireless access point which requires the user to wait a shorter period of time for communication. However, user may possibly be connected to an undesired wireless access point. That is, when the above-described wireless information terminal is used, it is difficult to establish connection to a specific wireless access point.

SUMMARY

Therefore, an aspect of example embodiments of the present invention is to provide a data communication system, an information processing apparatus, and a storage medium having stored thereon an information processing program which allow connection to a specific connection point apparatus.

Example embodiments of the present invention have the following features to solve the problem mentioned above. It is noted that reference characters, step numbers, and supplementary explanations in parentheses are merely provided to facilitate the understanding of the example embodiments of the present invention in relation to the later-described embodiment, rather than limiting the scope of the present invention in any way.

A first aspect is a data communication system including a first communication terminal (2), a second communication terminal (1) and a connection point apparatus (3). The first communication terminal comprises connection point data transmitting means (38, FIG. 5). The connection point data transmitting means transmits connection point data (connection data) for communicating with the connection point apparatus. The second communication terminal comprises connection point data receiving means (38, CPU 31 executing step 54, step 56, step 61, step 63, and step 64; hereinafter simply denoted by step numbers) and communication means (S71 to S78). The connection point data receiving means attempts to receive the connection point data from the first communication terminal. The communication means attempts to communicate with the connection point apparatus by using the connection point data received by the connection point data receiving means. The connection point apparatus may be replaced with a wireless access point, another information processing apparatus, another communication terminal, another game apparatus, and the like.

In a second aspect based on the first aspect, the connection point data at least includes data indicative of an identifier for identifying the connection point apparatus. The communication means communicates with the connection point apparatus by using the data indicative of the identifier included in the connection point data.

In a third aspect based on the second aspect, the connection point apparatus is a wireless access point. The identifier is an SSID (Service Set Identifier).

In a fourth aspect based on the second aspect, the connection point apparatus is a wireless access point. The identifier is a MAC address (Media Access Control address).

In a fifth aspect based on the second aspect, data communicated between the connection point apparatus and the second communication terminal is encoded by using a key. The connection point data further includes data indicative of the key. The communication means communicates with the connection point apparatus by using the identifier included in the connection point data and the data indicative of the key.

In a sixth aspect based on the first aspect, the connection point apparatus is a wireless access point which transmits, at regular intervals, a beacon including data for establish synchronization of a wireless network. The second communication terminal further includes beacon receiving means for receiving the beacon transmitted from the connection point apparatus. The communication means attempts to communicate with the connection point apparatus by using data included in the beacon received by the beacon receiving means and the connection point data received by the connection point data receiving means.

In a seventh aspect based on the first aspect, the connection point data receiving means attempts to receive the connection point data by using a dedicated protocol which is installed on at least each of the first communication terminal and the second communication terminal.

In an eighth aspect based on the first aspect, the connection point data receiving means receives the connection point data without outputting an radio wave therefrom when the second communication terminal is started.

In a ninth aspect based on the first aspect, the second communication terminal further includes launcher means (S55, S62) The launcher means prompts a user to select an application program to be launched from among a plurality of application programs, and launches the selected application program. When the connection point data receiving means has received the connection point data, the launcher means notifies the user that a connection application program is executable, the connection application program including a program for causing the second communication terminal to execute a procedural step of connecting to the connection point apparatus.

In a tenth aspect based on the ninth aspect, the connection application program is a viewer program for establishing connection to a network via the connection point apparatus.

In an eleventh aspect based on the ninth aspect, the connection point data receiving means attempts to receive the connection point data after the second communication terminal is started until before the launcher means becomes capable of receiving a selection operation performed by the user.

In a twelfth aspect based on the eleventh aspect, the connection point data receiving means continuously attempts to receive the connection point data after the second communication terminal is started and even after the launcher means becomes capable of receiving the selection operation performed by the user.

In a thirteenth aspect based on the first aspect, the data communication system further comprises a third communication terminal (1). The third communication terminal includes application receiving means, connection point data receiving means, and communication means. The application receiving means downloads a connection application program including a program for causing the third communication terminal to execute a procedural step of connecting to the connection point apparatus, and installs the connection application program onto the third communication terminal. The connection point data receiving means attempts to receive the connection point data from the first communication terminal. The communication means attempts to communicate with the connection point apparatus by using the connection point data received by the connection point data receiving means when the connection application program is executed.

In a fourteenth aspect based on the thirteenth aspect, the connection application program is a viewer program for establishing connection to a network via the connection point apparatus.

In a fifteenth aspect based on the thirteenth aspect, the application receiving means downloads the connection application program by using a dedicated protocol which is installed on at least each of the first communication terminal and the third communication terminal.

In a sixteenth aspect based on the first aspect, the connection point data further includes data for specifying a predetermined content. The communication means communicates with the connection point apparatus, and obtains, via a network, the content which is specified by the data for specifying the predetermined content.

In a seventeenth aspect based on the sixteenth aspect, the second communication terminal further includes icon display control means (S76). The icon display control means obtains an icon relating to the content from a server on the network, and displays the icon on a display device so as to prompt the user to select the icon. The communication means obtains, via the network, the content relating to the icon (Ism) selected by an operation performed by the user.

In an eighteenth aspect based on the first aspect, the second communication terminal further includes connection point data storage means (32, Db) and reconnection means (S81). The connection point data storage means keeps storing the connection point data received by the connection point data receiving means until the second communication terminal is shut down. The reconnection means attempts to reconnect to the connection point apparatus in accordance with the connection point data stored in the connection point data storage means when connection to the connection point apparatus is established and then interrupted.

In a nineteenth aspect based on the first aspect, the second communication terminal further includes received strength level detection means. The received strength level detection means detects a received strength level when the connection point data is received from the first communication terminal (FIG. 7). When the connection point data receiving means has received a plurality of pieces of the connection point data, the communication means successively selects a piece of the connection point data, from among the plurality of pieces of the connection point data, in order of descending received strength level, and attempts to communicate with the connection point apparatus.

In a twentieth aspect based on the first aspect, the communication means attempts to communicate with the connection point apparatus by using the connection point data which is being received by the connection point data receiving means.

In a twenty-first aspect based on the first aspect, the second communication terminal further includes connection point data storage means. The connection point data storage means keeps storing the connection point data received by the connection point data receiving means until the second communication terminal is shut down. The communication means attempts to communicate with the connection point apparatus by using the connection point data stored in the connection point data storage means.

In a twenty-second aspect is an information processing apparatus (1) for communicating with a connection point apparatus. The information processing apparatus includes connection point data receiving means and communication means. The connection point data receiving means attempts to receive connection point data which is transmitted from another communication terminal and which is used for communicating with the connection point apparatus. The communication means attempts to communicate with the connection point apparatus by using the connection point data received by the connection point data receiving means.

In a twenty-third aspect is an information processing apparatus (2) for transmitting data to another communication terminal (1) which communicates with a connection point apparatus. The information processing apparatus includes connection point data transmitting means. The connection point data transmitting means transmits connection point data to the another communication terminal such that the another communication terminal communicates with the connection point apparatus by using the connection point data.

In a twenty-fourth aspect is a computer-readable storage medium having stored thereon an information processing program executed on a computer (31) of an information processing apparatus which communicates with a connection point apparatus (1). The information processing program causes the computer to function as connection point data receiving means and communication means. The connection point data receiving means attempts to receive connection point data which is transmitted from another communication terminal and which is used for communicating with the connection point apparatus. The communication means attempts to communicate with the connection point apparatus by using the connection point data received by the connection point data receiving means.

According to the first aspect, the second communication terminal is capable of communicating with the connection point apparatus using connection point data only when the second communication terminal receives the connection point data from the first communication terminal or when the second communication terminal has received the connection point data once. Therefore, it is possible to prevent the second communication terminal from connecting to or being connected to an apparatus other than the connection point apparatus which is connected by using the connection point data, and it is possible to establish connection to only the connection point apparatus specified by the connection point data.

According to the second aspect, even if a user does not know the identifier of the connection point apparatus in advance, the user can establish connection to the connection point apparatus, and can establish connection to an indefinite number of connection point apparatuses.

According to the third aspect, even if the user does not know the SSID in advance, the user can establish connection to the wireless access point, and also can connect to an indefinite number of wireless access points. Furthers as compared to a case where the SSID of the wireless access point is set to ANY, not all apparatuses can automatically establish connection, but only such apparatuses that receive the SSID can establish connection. Therefore, unlike the case where the SSID is set to ANY, disordered connection will not be established.

According to the fourth aspect, even if the user does not know the MAC address in advance, the user can establish connection to the wireless access point, and can establish connection to an indefinite number of wireless access points.

According to the fifth aspect, even if the user does not know the identifier and the key of the connection point apparatus in advance, the user can establish connection to the connection point apparatus, and can establish connection to an indefinite number of connection point apparatuses. Further, even when another connection point apparatus, which uses the same identifier as the connection point apparatus, exists incidentally, it is possible to prevent the user from establishing connection to the another connection point apparatus.

According to the sixth aspect, only when the second communication terminal receives the connection point data from the first communication terminal and a beacon from the connection point apparatus (wireless access point), or when the second communication terminal has received the connection point data once and receives the beacon, the second communication terminal is capable of communicating with the connection point apparatus by using the connection point data and data included in the beacon.

According to the seventh aspect, it is possible to limit the second communication terminal which is connectable to the connection point apparatus.

According to the eighth aspect, a radio wave for receiving data from another apparatus is not outputted automatically immediately after the power is turned ON. Therefore, even in a circumstance where an output of an electromagnetic wave is prohibited (e.g., in an airplane), the power of the second communication terminal can be turned ON.

According to the ninth aspect, when a list of a plurality of application programs is displayed by using icons so as to prompt the user to select an application program to be launched, the user is notified that such a application that has a function of connecting to the connection point apparatus is executable in accordance with whether or not the connection point data is received. Accordingly, it is possible to notify the user that the application is usable, and also possible to prompt the user to launch the application.

According to the eleventh and twelfth aspects, the connection point data receiving means attempts to obtain the connection point data before and/or during displaying the launcher menu, and notifies the user whether or not an application including a program for executing a procedural step of connecting to the connection point apparatus is executable. Accordingly, it is possible to instantly notify the user that the application is usable.

According to the thirteenth aspect, the third communication terminal, which does not have the connection application program installed therein, can establish connection to the connection point apparatus. Accordingly, even if both of the second communication terminal and the third communication terminal exist concurrently, it is possible to configure a system for communicating with the connection point apparatus.

According to the tenth and fourteenth aspects, it is possible to notify the user that the viewer program is usable, and also possible to prompt the user to launch the viewer program.

According to the fifteenth aspect, it is possible to limit the third communication terminal which is connectable to the connection point apparatus.

According to the sixteenth aspect, it is possible to distribute a predetermined content to the user.

According to the seventeenth aspect, it is possible to allow the user to select a desired content from among contents provided via the connection point apparatus.

According to the eighteenth aspect, even if communication with the connection point apparatus is interrupted, it is possible to reconnect to the connection point apparatus. Therefore, it is possible to prevent the communication from being ended when the communication is interrupted.

According to the nineteenth aspect, since the connection point apparatus selects the connection point data in order of descending received strength level, it is possible to establish connection preferentially with the connection point apparatus which uses the connection point data in a favorable reception state.

According to the twentieth aspect, the second communication terminal can communicate with the connection point apparatus by using the connection point data only when the second communication terminal receives the connection point data from the first communication terminal. Therefore, when the second communication terminal is within an area in which the connection point data can be received, and also within an area in which communication with the connection point apparatus is possible, then the second communication terminal can communicate with the connection point apparatus.

According to the twenty-first aspect, even if an area in which the connection point data is receivable are not overlapped with an area in which connection to the connection point apparatus is possible, it is possible to establish connection to the connection point apparatus in such a non-overlapped area as long as the connection point data has been received once.

Further, according to the information processing apparatus and a computer-readable storage medium having stored thereon the information processing program of example embodiments of the present invention, the same advantageous effects as those of the above-described data communication system may be obtained.

These and other features, aspects and advantages of the example embodiments of the present invention will become more apparent from the following detailed description of the example embodiments of the present invention when taken in conjunction with the accompanying drawings.

BRIEF DESCRIPTION OF THE DRAWINGS

FIG. 2 is a block diagram showing an example of an internal configuration of the game apparatus 1 shown in FIG. 1;

FIG. 4 is a diagram showing an exemplary display on the lower LCD 12 shown in FIG. 1, where a plurality of icons is numbered;

FIG. 7 is a diagram showing exemplary connection data Db shown in FIG. 6;

FIG. 10 is a diagram showing an exemplary display on the lower LCD 12, where an icon I11 is displayed in a non-emphasized manner without being distinguished from other icons I; and FIG. 11 is a diagram showing an exemplary display on the lower LCD 12, where icons Ism1 and Ism2 are displayed.

DESCRIPTION OF THE EXAMPLE EMBODIMENTS

Figure 1:
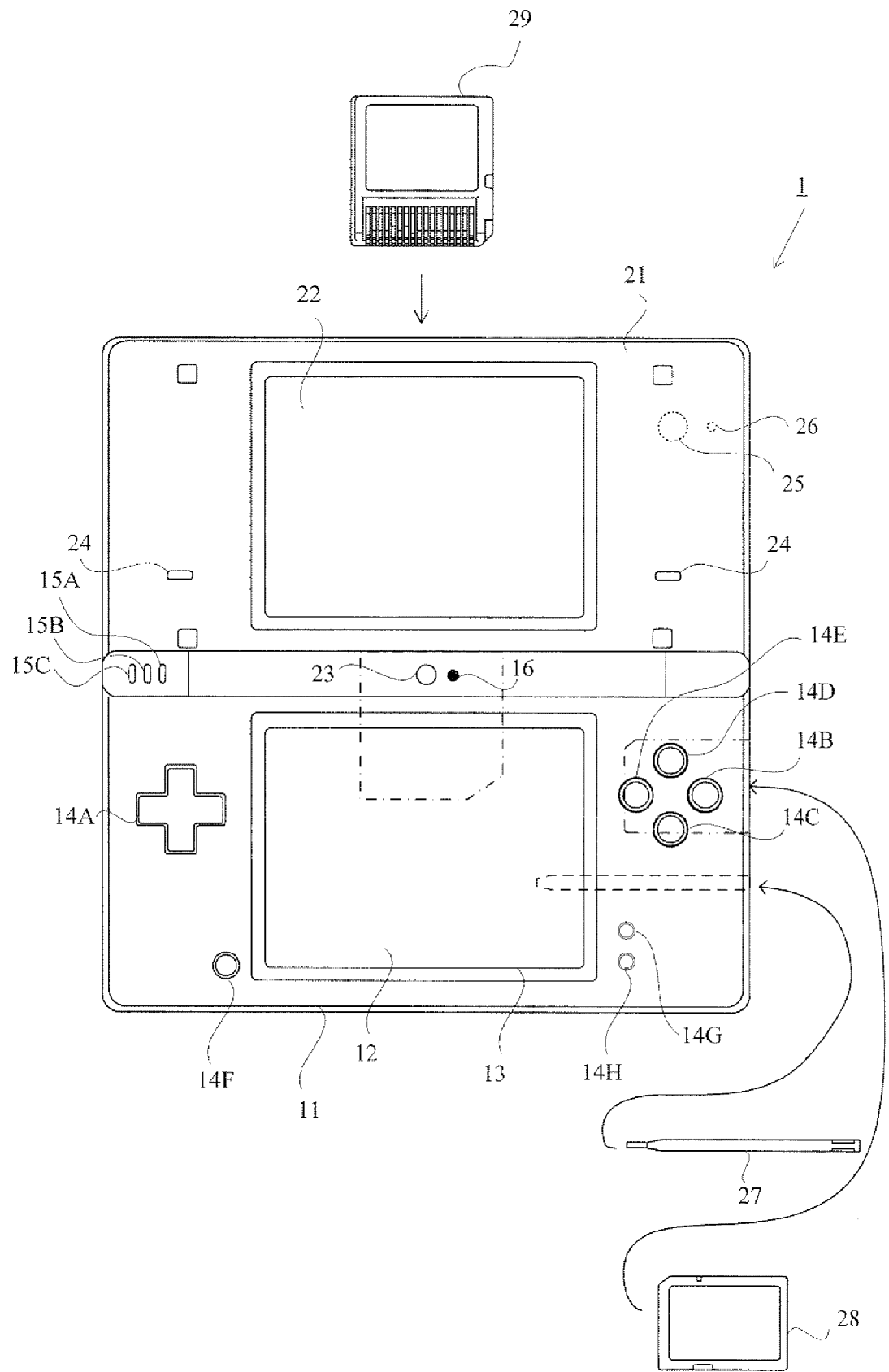
FIG. 1 is an outer appearance of a game apparatus 1 on which an information processing program according to one embodiment of the present invention is executed.

With reference to drawings, an information processing apparatus executing an information processing program according to one embodiment of the present invention will be described. Although the information processing program of the present invention is usable by executing the same on any computer system which is capable of performing a display on a display device, a game apparatus 1 will be used as an exemplary information processing apparatus, and the information processing program will be described by using an information processing program executed on the game apparatus 1. FIG. 1 is an outer appearance of the game apparatus 1 on which the information processing program of the present invention is executed. Here, as an exemplary game apparatus 1, a hand-held game apparatus is shown. The game apparatus 1 includes a camera, and also functions as an imaging apparatus to take an image with the camera, to display the taken image on a screen, and to store data of the taken image.

As shown in FIG. 1, the game apparatus 1 is a foldable hand-held game apparatus in an opened state. The game apparatus 1 is configured to have such a size as to be held by a user with both hands or one hand.

The game apparatus 1 includes a lower housing 11 and an upper housing 21. The lower housing 11 and the upper housing 21 are connected to each other so as to be capable of being opened or closed (foldable). In an example of FIG. 1, the lower housing 11 and the upper housing 21 are each formed in a plate-like shape of a horizontally long rectangle, and foldably connected to each other at long side portions thereof. Usually, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. It is noted that although an LCD is used as a display device provided in the game apparatus 1 in the present embodiment, any other display devices such as a display device using an EL (Electro Luminescence) may be used. In addition, the game apparatus 1 can use a display device of any resolution. Although details will be described later, the lower LCD 12 is used mainly for displaying an image taken by an inner camera 23 and an outer camera 25 in real time.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14F is used for turning the power of the game apparatus 1 ON/OFF. In the example shown in FIG. 1, the direction input button 14A and the power button 14F are provided on the inner main surface of the lower housing 11, and on one of a left side and a right side (on the left side in FIG. 1) of the lower LCD 12 which is provided substantially at a central portion of the inner main surface of the lower housing. The operation buttons 14B to 14E, the start button 14G, and the select button 14H are also provided on the inner main surface of the lower housing 11 and on the other one of the left side and the right side (on the right side in FIG. 1) of the lower LCD 12. The direction input button 14A, the operation buttons 14B to 14E, the start button 14G and the select button 14H are used for performing various operations with respect to the game apparatus 1.

It is noted that the operation buttons 14I to 14K are omitted in FIG. 1. For example, an L button 14I is provided at a left end of an upper side surface of the lower housing 11, and the R button 14J is provided at a right end of the upper side surface of the lower housing 11. The L button 14I and the R button 14J are used, for example, for performing a photographing instruction operation (a shutter operation) with respect to the game apparatus 1. In addition, the volume button 14K is provided on the left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted so as to cover a screen of the lower LCD 12. In the present embodiment, the touch panel 13 is, for example, a resistive film type touch panel. However, the touch panel 13 is not limited to the resistive film type, but any press-type touch panel may be used. The touch panel 13 used in the present embodiment has the same resolution (detection accuracy) as the lower LCD 12. However, the resolution of the touch panel 13 and the resolution of the lower LCD 12 is not necessarily the same as each other. In the right side surface of the lower housing 11, an insertion opening (a dotted line shown in FIG. 1) for a stylus pen 27 is provided. The insertion opening is capable of accommodating a stylus pen 27 which is used for performing an operation with respect to the touch panel 13. Although an input to the touch panel 13 is usually performed by using the stylus pen 27, a finger of the user may be used for operating the touch panel 13 instead of the stylus pen 27.

In the right side surface of the lower housing 11, an insertion slot (indicated by a two-dot chain line in FIG. 1) is provide for accommodating a memory card 28. Inside the insertion slot, a connector (net shown) is provided for electrically connecting the game apparatus 1 to the memory card 28. The memory card 28 is, for example, an SD (Secure Digital) memory card, and is detachably mounted to the connector. The memory card 28 is used, for example, for storing (saving) an image taken by the game apparatus 1, and loading an image generated on another apparatus into the game apparatus 1.

Further, in the upper side surface of the lower housing 11, an insertion slot (indicated by a chain line in FIG. 1) is provided for accommodating a memory card 29. Inside the insertion slot, a connector (not shown) is provided for electrically connecting the game apparatus 1 to the memory card 29. The memory card 29 is a storage medium having stored thereon an information processing program, a game program, and the like, and is detachably mounted in the insertion slot provided in the lower housing 11.

Three LEDs 15A to 15C are mounted to a right side part of the connection portion where the lower housing 11 and the upper housing 21 are connected to each other. The game apparatus 1 is capable of performing wireless communication with another apparatus, and the first LED 15A is lit up while wireless communication is established. The second LED 15B is lit up while the game apparatus 1 is charged. The third LED 15C is lit up while the power of the game apparatus 1 is ON. Thus, by the three LEDs 15A to 15C, a state of communication establishment of the game apparatus 1, a state of charge of the game apparatus 1, and a state of ON/OFF of the power of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. As with the lower LCD 12, a display device of another type having any resolution may be used instead of the upper LCD 22. For example, a touch panel may be provided so as to cover the upper LCD 22.

In the upper housing 21, two cameras (the inner camera 23 and the outer camera 25) are provided. As shown in FIG. 1, the inner camera 23 is mounted in an inner main surface of the upper housing 21 and adjacent to the connection portion. On the other hand, the outer camera 25 is mounted in a surface opposite to the surface in which the inner camera 23 is mounted, namely, in an outer main surface of the upper housing 21 (which is a surface located on the outside of the game apparatus 1 in the closed state, and a back surface of the upper housing 21 shown in FIG. 1). In FIG. 1, the outer camera 25 is indicated by a dashed line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In this manner, in the present embodiment, the inner camera 23 and the outer camera 25 are provided such that the imaging directions thereof are opposite to each other. For example, the user can take an image of a view as viewed from the game apparatus 1 toward the user with the inner camera 23 as well as an image of a view as viewed from the game apparatus 1 in a direction opposite to the user with the outer camera 25.

In the inner main surface, a microphone (microphone 43 shown in FIG. 2) is accommodated as a voice input device in the vicinity of the connection portion. In the inner main surface, microphone hole 16 is formed in the vicinity of the connection portion so as to allow the microphone 43 to detect sound outside the game apparatus 1. The accommodating position of the microphone 43 and the position of the microphone hole 16 are not necessarily in the vicinity of to the connection portion. For example, the microphone 43 may be accommodated in the lower housing 11, and the microphone hole 16 may be provided in the lower housing 11 so as to correspond to the accommodating position of the microphone 43.

In the outer main surface of the upper housing 21, a fourth LED 26 (indicated by a dashed line in FIG. 1) is mounted. The fourth LED 26 is lit up at a time when photographing is performed with the inner camera 23 or the outer camera 25 (when a shutter button is pressed). Further, the fourth LED 26 is lit up while moving images are taken by the inner camera 23 or the outer camera 25. By the fourth LED 26, an object person who is (being) photographed and people around the object person are notified that photographing is performed (being performed) by the game apparatus 1.

Sound holes 24 are formed in the inner main surface of the upper housing 21 and situated on left and right sides of the upper LCD 22 which is provided substantially at a central portion of the inner main surface of the upper housing 21. The speakers are accommodated in the upper housing 21 and at the back of the sound holes 24. The sound holes 24 are holes for releasing sound from the speakers therethrough.

As above described, the inner camera 23 and the outer camera 25 which are components for taking an image, and the upper LCD 22 which is display means for displaying various images are provided in the upper housing 21. On the other hand, the input devices (the touch panel 13 and the buttons 14A to 14K) for performing operation inputs with respect to the game apparatus 1, and the lower LCD 12 which is display means for displaying various images are provided in the lower housing 11. For example, when using the game apparatus 1, the user can hold the lower housing 11 and perform an input with respect to the input device while displaying a taken image (an image taken by the camera) on the lower LCD 12 or the upper LCD 22.

With reference to FIG. 2, an internal configuration of the game apparatus 1 will be described. FIG. 2 is a block diagram showing an example of the internal configuration of the game apparatus 1.

As shown in FIG. 2, the game apparatus 1 includes electronic components such as a CPU 31, a main memory 32, a memory control circuit 33, a stored data memory 34, a preset data memory 35, a memory card interfaces (memory card I/Fs) 36 and 37, a wireless communication module 38, a local communication module 39, a real time clock (RTC) 40, a power circuit 41, and an interface circuit (I/F circuit) 42. These electronic components are mounted on an electronic circuit substrate and accommodated in the lower housing 11 (or may be accommodated in the upper housing 21).

The CPU 31 is information processing means for executing a predetermined program. In the present embodiment, the predetermined program is stored in a memory (e.g., the stored data memory 34) within the game apparatus 1 or in the memory cards 28 and/or 29, and the CPU 31 executes the predetermined program, thereby executing the information processing described later. It is noted that the program executed by the CPU 31 may be stored in advance in a memory within the game apparatus 1, may be obtained from the memory cards 28 and/or 29, or may be obtained from another apparatus by means of communication with the another apparatus.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In other words, the main memory 32 stores therein various data used in the information processing, and also stores a program obtained externally (from the memory cards 28 and 29, another apparatus, and the like). In the present embodiment, for example, a PSRAM (Pseudo-SRAM) is used as the main memory 32. The stored data memory 34 is storage means for storing the program executed by the CPU 31, and data of images taken by the inner camera 23 and the outer camera 25, and the like. The stored data memory 34 is composed of a nonvolatile storage means, and is composed of a NAND flash memory in the present embodiment, for example. The memory control circuit 33 is a circuit for controlling reading of data from the stored data memory 34 and writing of data to the stored data memory in accordance with an instruction from the CPU 31. The preset data memory 35 is storage means for storing data (preset data) of various parameters, which are set in advance in the game apparatus 1, and the like. A flash memory connected to the CPU 31 via an SPI (Serial Peripheral interface) bus can be used as the preset data memory 35.

The memory card I/Fs 36 and 37 are connected to the CPU 31. The memory card I/F 36 reads data from and writes data to the memory card 28 which is mounted to the connector in accordance with an instruction from the CPU 31. The memory card I/F 37 reads data from and writes data to the memory card 29 which is mounted to the connector in accordance with an instruction from the CPU 31. In the present embodiment, data of images taken by the inner camera 23 and the outer camera 25 are written to the memory card 28, and image data stored in the memory card 28 are read from the memory card 28 to be stored in the stored data memory 34. Various programs stored in the memory card 29 are read by the CPU 31 to be executed.

The information processing program of example embodiments of the present invention may be supplied to a computer system not only from an external storage medium such as the memory card 29 but also via a wired or wireless communication line. The information processing program may be stored in advance in an nonvolatile storage unit within the computer system. An information storage medium for storing the information processing program is not limited to the above nonvolatile storage unit, but may be a CD-ROM, a DVD or an optical disc-shaped storage medium similar thereto.

The wireless communication module 38 functions to connect to a wireless LAN, for example, by a method conformed to the standard of IEEE802.11.b/g. The local communication module 39 functions to wirelessly communicate with a game apparatus of the same type by a predetermined communication method. The wireless communication module 38 and the local communication module 39 are connected to the CPU 31. The CPU 31 is capable of receiving data from and sending data to another apparatus via the Internet using the wireless communication module 38, and also capable of receiving data from and sending data to another game apparatus of the same type using the local communication module 39.

The RTC 40 and the power circuit 41 are connected to the CPU 31. The RTC 40 counts a time, and outputs the time to the CPU 31. For example, the CPU 31 is capable of calculating a current time (data) and the like based on the time counted by the RTC 40. The power circuit 41 controls electric power from a power supply (typically, a battery accommodated in the lower housing 11) of the game apparatus 1 to supply the electric power to each of the electronic components of the game apparatus 1.

The game apparatus 1 includes the microphone 43 and an amplifier 44. The microphone 43 and the amplifier 44 are respectively connected to the I/F circuit 42. The microphone 43 detects voice uttered by the user toward the game apparatus 1, and a voice signal indicative of the voice is outputted to the I/F circuit 42. The amplifier 44 amplifies the voice signal from the I/F circuit 42, and causes the speakers (not shown) to output the voice signal. The I/F circuit 42 is connected to the CPU 31.

The touch panel 13 is connected to the I/F circuit 42. The I/F circuit 42 includes a voice control circuit for controlling the microphone 43 and the amplifier 44 (speakers), and a touch panel control circuit for controlling the touch panel 13. The voice control circuit performs A/D conversion and D/A conversion with respect to the voice signal, and converts the voice signal into voice data in a predetermined format. The touch panel control circuit generates touch position data in a predetermined format in accordance with a signal from the touch panel 13, and outputs the touch position data to the CPU 31. For example, the touch position data is data indicative of a coordinate point of a position on an input surface of the touch panel 13 at which an input is performed. The touch panel control circuit reads a signal from the touch panel 13 and generates touch position data every predetermined time period. The CPU 31 is capable of recognizing a position on the touch panel 13 at which an input is performed by obtaining the touch position data via the I/F circuit 42.

The operation buttons 14 are composed of the operation buttons 14A to 14K, and are connected to the CPU 31. The operation buttons 14 outputs, to the CPU 31, operation data indicative of an input state with respect to each of the operation buttons 14A to 14K (whether or not each button is pressed). The CPU 31 obtains the operation data from the operation buttons 14, and executes processing in accordance with an input with respect to each of the operation buttons 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. For example, the CPU 31 gives an imaging instruction to either of the inner camera 23 and the outer camera 25, and the camera which has received the imaging instruction takes an image and sends image data to the CPU 31.

The lower LCD 12 and the upper LCD 22 are each connected to the CPU 31. Each of the lower LCD 12 and the upper LCD 22 displays an image in accordance with an instruction from the CPU 31. For example, the CPU 31 displays an image obtained from either of the inner camera 23 and the outer camera 25 on the lower LCD 12, and also displays an operation explanation screens which is generated by predetermined processing, on the upper LCD 22. The CPU 31 displays objects configured with the plurality of icons I on the lower LCD 12, and also displays an image relating to a selected icon I on the upper LCD 22. As an alternative example, the CPU 31 displays an image obtained from either of the inner camera 23 and the outer camera 25 on the lower LCD 12, and also displays the operation explanation screen generated by the predetermined processing on the upper LCD 22.

Figure 3:
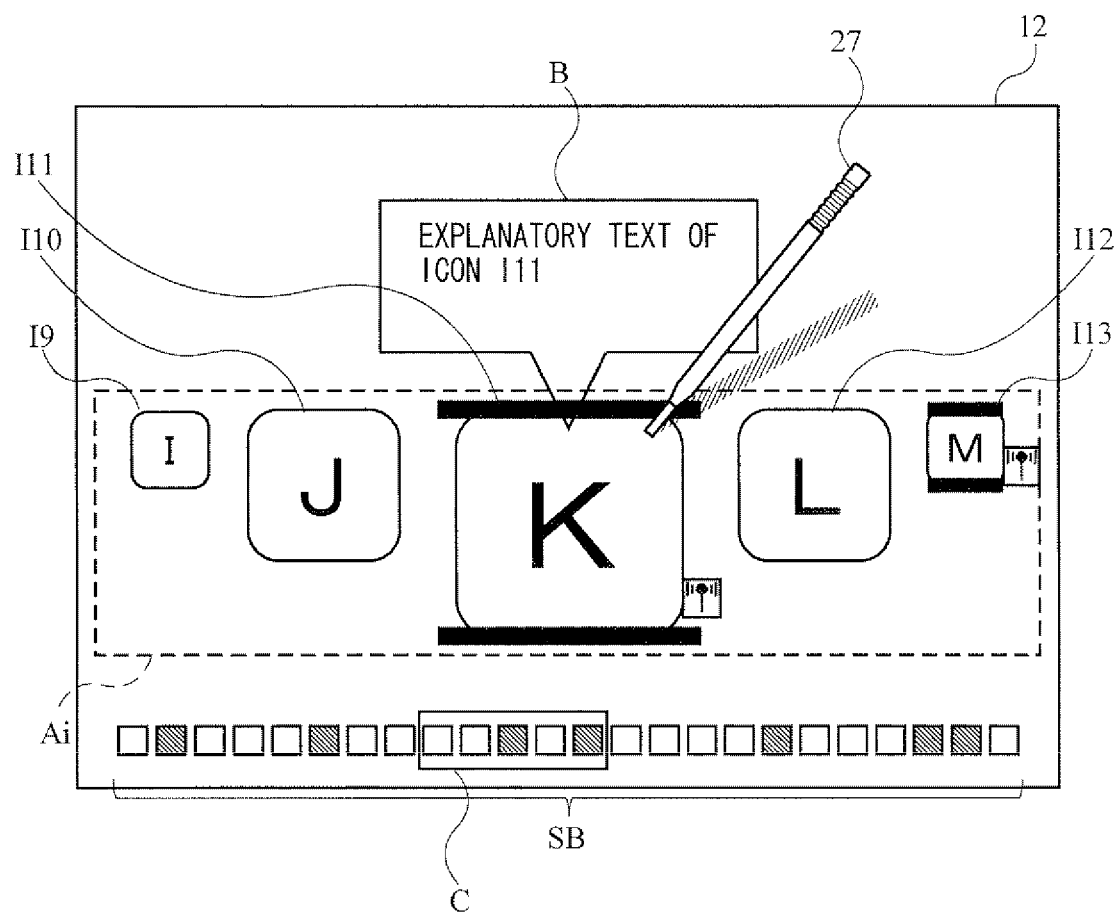
FIG. 3 is a diagram showing an exemplary screen display displayed on a lower LCD 12 shown in FIG. 1.
Figure 5:
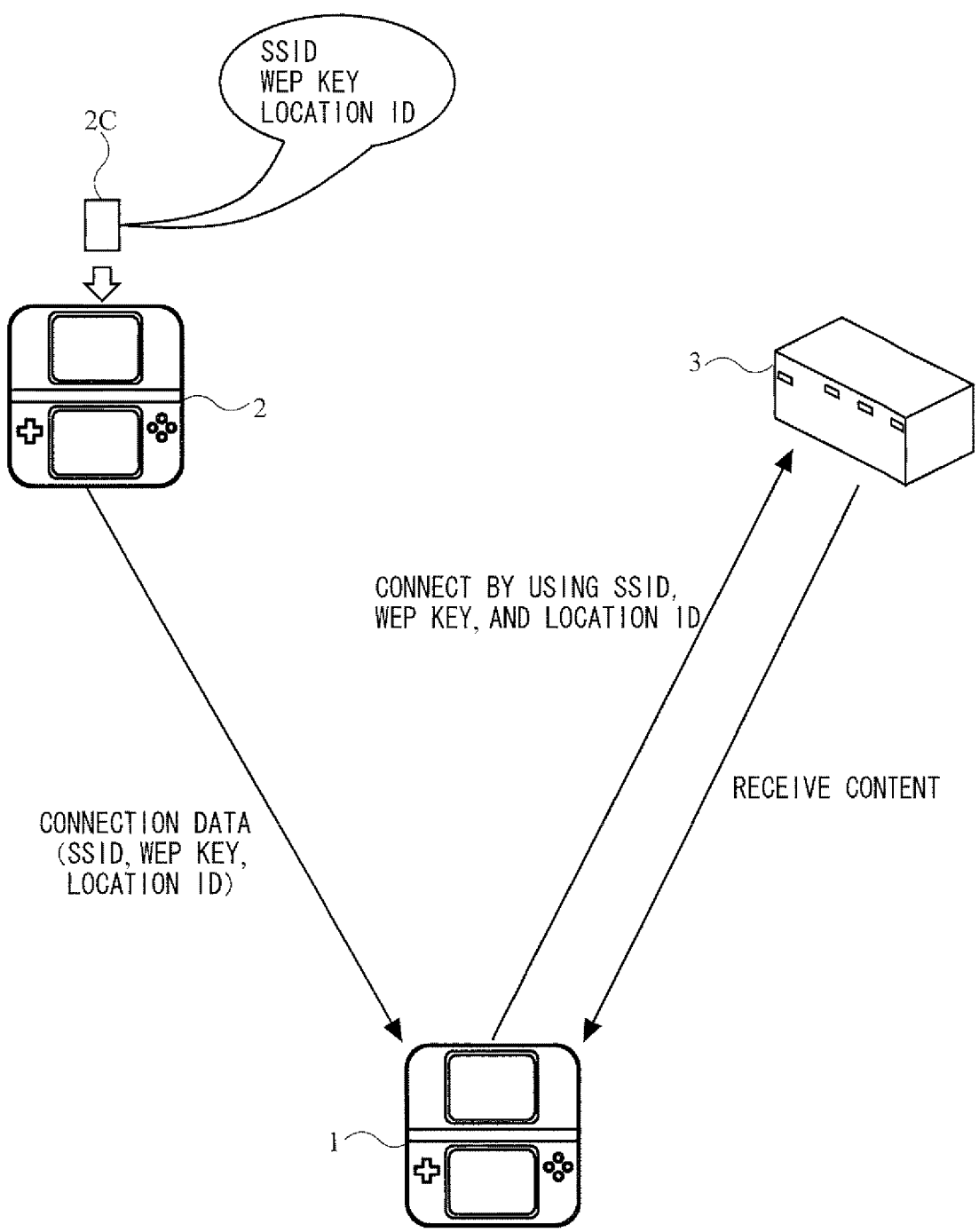
FIG. 5 is a diagram showing an exemplary system in which the game apparatus 1 shown in FIG. 1 is connected to a wireless access point 3.

Next, prior to description of a specific processing operation by the information processing program executed on the game apparatus 1, an exemplary display form displayed on the lower LCD 12 and/or the upper LCD 22 by the processing operation, an exemplary connection with another apparatus, and the like will be described, with reference to FIGS. 3 to 5. FIG. 3 is a diagram showing an exemplary screen display which is displayed on the lower LCD 12. FIG. 4 is a diagram showing an example of a plurality of icons I which is numbered and displayed. FIG. 5 is a diagram showing an exemplary system in which the game apparatus 1 is connected to the wireless access point 3.

As shown in FIG. 3, five icons I (icons I9, I10, I11, I12, I13), a dialog balloon B, a slide bar SB, and a cursor C are displayed on the lower LCD 12. These images are displayed by displaying a list of files and programs, which are registered in advance, using the icons I, by performing a touch operation on the touch panel 13, and by causing the CPU 31 to execute application software (launcher) for launching the file and the programs relating to the icons I.

The icons I are images relating to files and programs (typically, computer programs executable by the CPU 31) which are registered in advance. The user can launch a desired program using any of the icons I. In the present embodiment, a total of 24 icons I (icons I1 to I24) are numbered in order as shown in FIG. 4, and according to this numbered order, several of these 24 icons I are displayed within a predetermined area Ai (hereinafter referred to as an icon line display area Ai) on the screen. In FIG. 3, an area surrounded with a dashed line represents the icon line display area Ai. The user selects an icon I corresponding to a desired program, from among a line of the icons displayed in the icon line display area Ai, thereby causing the CPU 31 to execute the desired program. Further, she user scrolls the line of the icons displayed in the icon line display area Ai, thereby capable of displaying any icons on the lower LCD 12 and selecting one of the icons.

The dialogue balloon B is an image for informing the user of an explanatory text (such as a program name and an explanation of the program corresponding to the icon I11, in the case of FIG. 3) relating to an icon (the icon I11) displayed at the central portion of the icon line display area Ai.

The slide bar SB is used in combination with the cursor C so as to provide the user with various functions. 24 shapes (e.g., a rectangle) are aligned and displayed in the slide bar SB, and these 24 shapes corresponds to 24 icons I1 to I24, respectively. The cursor C indicates such icons, among the icons I1 to I24 displayed in the slide bar SB, that are currently displayed in the icon line display area Ai. The user performs a drag operation by moving the cursor C along the slide bar SB (i.e., in a horizontal direction) using the stylus pen 27, thereby moving the cursor C to any position on the slide bar. Further, the user performs a touch operation by touching any point on the slide bar SB using the stylus pen 27, thereby moving the cursor C to the point. When a position of the cursor C on the slide bar SB has changed, the icons I to be displayed on to the icon line display area Ai are also changed accordingly. In this manner, the user can display desired icons I, from among the icons I1 to I24, in the icon line display area Ai using the slide bar SB and the cursor C.

When the user performs a tap operation, with the stylus pen 27, with respect to the icon I11, which is displayed at a central portion of the icon line display area Ai, a program relating to the tapped icon I11 is executed. In the state shown in FIG. 3, when the user performs the tap operation, with the stylus pen 27, with respect to the icons I (icons I9, I10, I12, I13) other than the icon I11 which is displayed at the central portion of the icon line display area Ai, the line of the icons is scrolled such that the tapped icon I moves toward the center of the icon line display area Ai.

The above-described icon operation method may be performed by using a hardware switch (the operation buttons 14). For example, in the state shown in FIG. 3, when the user presses down the operation button 14D, a program relating to the icon I11 which is displayed at the central portion of the icon line display area Ai is launched. Further, when the user presses down a right button (i.e., a right portion of the direction input button 14A), the line of the icons scrolls by one icon I to the right side of the screen. When the user presses down a left button (i.e., a left portion of the direction input button 14A), the icon line scrolls by one icon I to the left side of the screen.

In the present embodiment, when the power of the game apparatus 1 is turned ON, the CPU 31 causes the launcher to start. When a launcher menu (FIG. 3) is displayed on the lower LCD 12, in accordance with an operation by the user, display forms of the icons I relating to files and programs usable by the user are changed so as to be easily distinguished from the remaining icons I. For example, when the launcher menu is displayed on the lower LCD 12, the icons I relating to the files and the programs usable by the user are displayed in an emphasized manner (e.g., by changing a color of upper/lower sides of the frames, or performing edge enhancement, enlargement, highlighting or the like).

In the exemplary display shown in FIG. 3, among the icons I9 to I13 displayed in the icon line display area Ai, the icons I11 and I13 are displayed in an emphasized manner (e.g., by changing colors of the upper/lower sides of the frames between seven colors, respectively). Further, FIG. 4 indicates that, among the icon I1 to I24, the icons I2, I6, I11, I13, I18, I22, and I23 are object icons to be displayed in an emphasized manner in the icon line display area Ai. Still further, shapes corresponding to the object icons, among the shapes aligned in the slide bar SB, are displayed such that colors of the shapes changes between seven colors, respectively. In this manner, the display forms of the icons I relating to the files and the programs usable by the user are changed, whereby the user can be informed of the usability of the icons I. It is also possible to prompt the user to start up the files and the programs relating to the icons I displayed in an emphasized manner.

For example, a viewer program is installed in the game apparatus 1 so as to display a content received from the Internet or another game apparatus of the same type. When the game apparatus 1 is in a state capable of receiving the content, the icon I, which relates to the viewer program for displaying the content, is displayed in an emphasized manner. Accordingly, the user can be informed that the game apparatus 1 receives the content, and is prompted to launch the viewer program for displaying the content.

As shown in FIG. 5, the game apparatus 1 receives a content from the Internet via a wireless access point 3. In this case, an identifier (e.g., an SSID (Service Set Identifier)) to connect to the wireless access point 3, and a key (e.g., a WEP (Wired Equivalent Privacy) key and a WPA (Wi-Fi Protected Access) key) which are designed to connect to the wireless access point 3, and an location ID indicating an location of the wireless access point 3 are received from another game apparatus 2. Hereinafter, data used for establishing connection to the wireless access point 3 is collectively referred to as connection data. For example, a memory card 2C, on which the SSID, the WEP key and the location ID are recorded in advance, is detachably mounted to the another game apparatus 2, and the another game apparatus 2 reads the SSID, the WEP key and the location ID recorded on the memory card 2C. The another game apparatus 2 is situated at a predetermined location such as a shop, and encodes the SSID, the WEP key, and the location ID (which are, hereinafter, referred to as the connection data). The another game apparatus 2 then wirelessly broadcasts the connection data at regular intervals (e.g., every 200 ms) within a predetermined range therefrom. Accordingly, the game apparatus 1 receives the connection data from the another game apparatus 2 via the local communication module 39, thereby capable of establishing connection to the wireless access point 3. The game apparatus 1 extracts the SSID, the WEP key, and the location ID included in the connection data, and establishes connection to the wireless access point 3 via the wireless communication module 38. The wireless access point 3 exemplifies a connection point device of example embodiments of the present invention, the game apparatus 1 exemplifies the second communication terminal of example embodiments of the present invention, and another apparatus 2 exemplifies the first communication terminal of the present application.

That is, the game apparatus 1 receives the connection data from another game apparatus 2, thereby automatically capable of establishing connection to the wireless access point 3. The user is informed by the change in the display form of the icons I that the game apparatus 1 is capable of displaying a content via the wireless access point 3. In this manner, the connection data including the SSID, the WEP key and the location ID are broadcast, whereby the game apparatus 1 is automatically caused to be connectable to the wireless access point 3. Therefore, even if the game apparatus 1 does not have the SSID, the WEP key, and the location ID installed in advance, the game apparatus 1 can be controlled so as to be connectable to various wireless access points 3, and accordingly, development of the system as a whole can be expected.

In this manner, the connection data such as the SSID, the WEP key and the like is transmitted from another game apparatus 2, whereby the user who does not know the SSID and the WEP key in advance can establish connection to the wireless access point 3. Accordingly, the user can establish connection to an indefinite number of wireless access points. It is noted that, as compared to a case where the SSID of the wireless access point 3 is set to "ANY", not all the game apparatuses 1 can automatically establish connection to the wireless access point 3, but only such game apparatuses 1 that receive permission from another game apparatus 2 can establish connection to the wireless access point 3. Therefore, unlike the case where the SSID is set to ANY, the connection does not create a disordered state.

For example, the connection data is transmitted from another game apparatus 2 to the game apparatus 1 by using a protocol dedicated to these game apparatuses. That is, only such apparatuses that perform communication using the protocol can receive the connection data, and thus only such apparatuses that use the protocol are capable of connecting to the wireless access point 3.

In this manner, when the connection data is received, the icon I relating to a program for executing a procedural step of connecting to the wireless access point 3 is displayed in an emphasized manner. It is noted that, a sign indicative of a program for executing the procedural step of connecting to the wireless access point 3 may be attached to the icon I, in addition to the above-described display in an emphasized manner. For example, as shown in FIG. 3, at the lower right side of the icon I, the sign indicative of the program/or executing the procedural step of connecting to the wireless access point 3 is displayed. Accordingly, even if the icon I is not displayed in an emphasized manner, it is possible to inform the user that the icon I represents an application program which allows the user to perform communication by connecting to the wireless access point 3.

Figure 6:
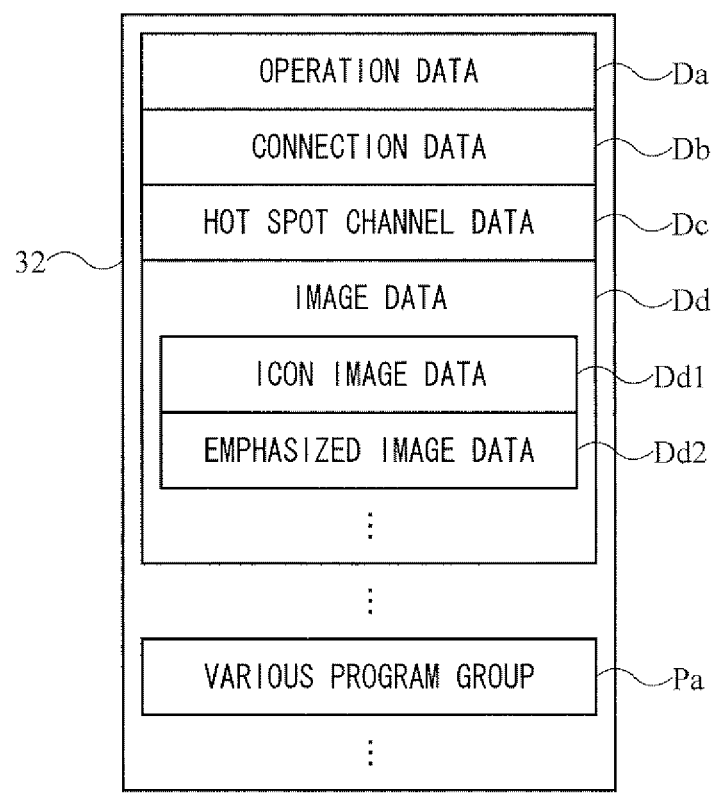
FIG. 6 is a diagram showing an example of various data which is stored in a main memory 32 by executing the information processing program.

Next, Prior to describing the processing operation performed on the game apparatus 1, various data used for executing the information processing program will be described with reference to FIGS. 6 and 7. FIG. 6 is a diagram showing an example of various data which is stored in the main memory 32 by executing the information processing program. FIG. 7 is a diagram showing exemplary connection data Db.

In FIG. 6, the main memory 32 stores therein a program read from the memory card 28 and the memory card 29 or temporary data generated during processing. As shown in FIG. 6, the operation data Da, the connection data Db, hot spot channel data Dc, image data Dd and the like are stored in the data storage area in the main memory 32. Further, stored in the program storage area in the main memory 32 are the information processing program, the viewer program for establishing connection to the wireless access point 3 and for browsing the Internet, the launcher program for displaying the list of the plurality of icons I, and various program group Pa including the programs and the like relating to the respective icons I. A flag is set on each of the programs included in the various program group Pa so as to indicate whether or not the program is designed to execute a procedural step of connecting to the wireless access point 3.

The operation data Da stores therein data on a touch coordinate point (touch coordinate point data) indicative of a touch point TP on a screen coordinate system touched by a player on the touch panel 13 and data indicative of a state of the operation buttons 14 operated by the player (operation button data). For example, the touch coordinate point data and the operation button data are obtained every unit time (e.g., $\frac{1}{60}$ sec.), during which the game apparatus 1 performs a game process, and are then stored in the operation data Da and updated.

The connection data Db stores therein data for establishing connection to the wireless access point 3, the data being received from another game apparatus 2. For example, as shown in FIG. 7, in the connection data Db, data indicative of the SSID, the WEP key, the location ID, a received strength level and a connection establishment flag are interrelated to one another, and stored. The data indicative of the SSID, the WEP key, and the location ID, which are stored in the connection data Db is described in accordance with the data received from another game apparatus 2. A received strength level of the data received from another game apparatus 2 is detected, and the received strength level is interrelated to the data and then stored. When data indicative of another SSID, another WEP key, and another location ID is received from still another game apparatus 2, the data is stored in the connection data Db as another piece of reception data. In other words, when the game apparatus 1 receives, from a plurality of another game apparatuses 2, a plurality pieces of data indicative of the SSIDs, the WEP keys, and the locations ID, which are respectively different from one another, then the respective pieces of data are stored individually in the connection data Db together with the received strength levels corresponding to the respective pieces of data. Further, the connection establishment flag is set ON when connection to the wireless access point 3 has been successfully established by using the stored SSID and the WEP key.

The hot spot channel data Dc stores therein data obtained from a predetermined server on the network via the wireless access point 3 when connection to the wireless access point 3 has been successfully established.

The image data Dd includes icon image data Dd1 and emphasized image data Dd2. The icon image data Dd1 is image data for causing the icons I to be displayed on the lower LCD 12 and/or the upper LCD 22. The emphasized image data Dd2 is image data for causing the icons I to be displayed on the lower LCD 12 and/or upper LCD 22 in an emphasized manner.

Figure 8:
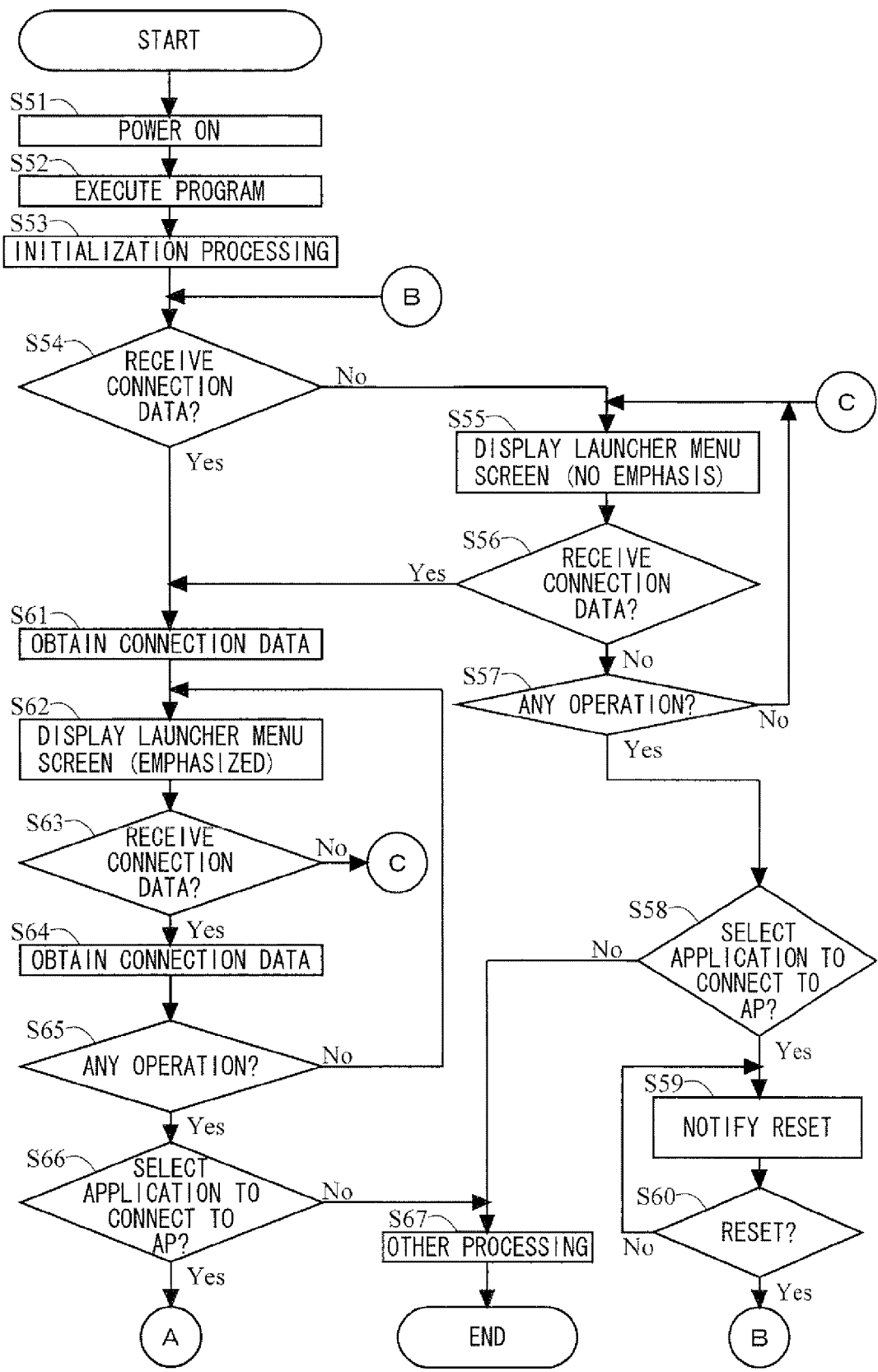
FIG. 8 is a flowchart showing a first half of information processing performed on the game apparatus 1 by executing the information processing program according to one embodiment of the present invention.
Figure 9:
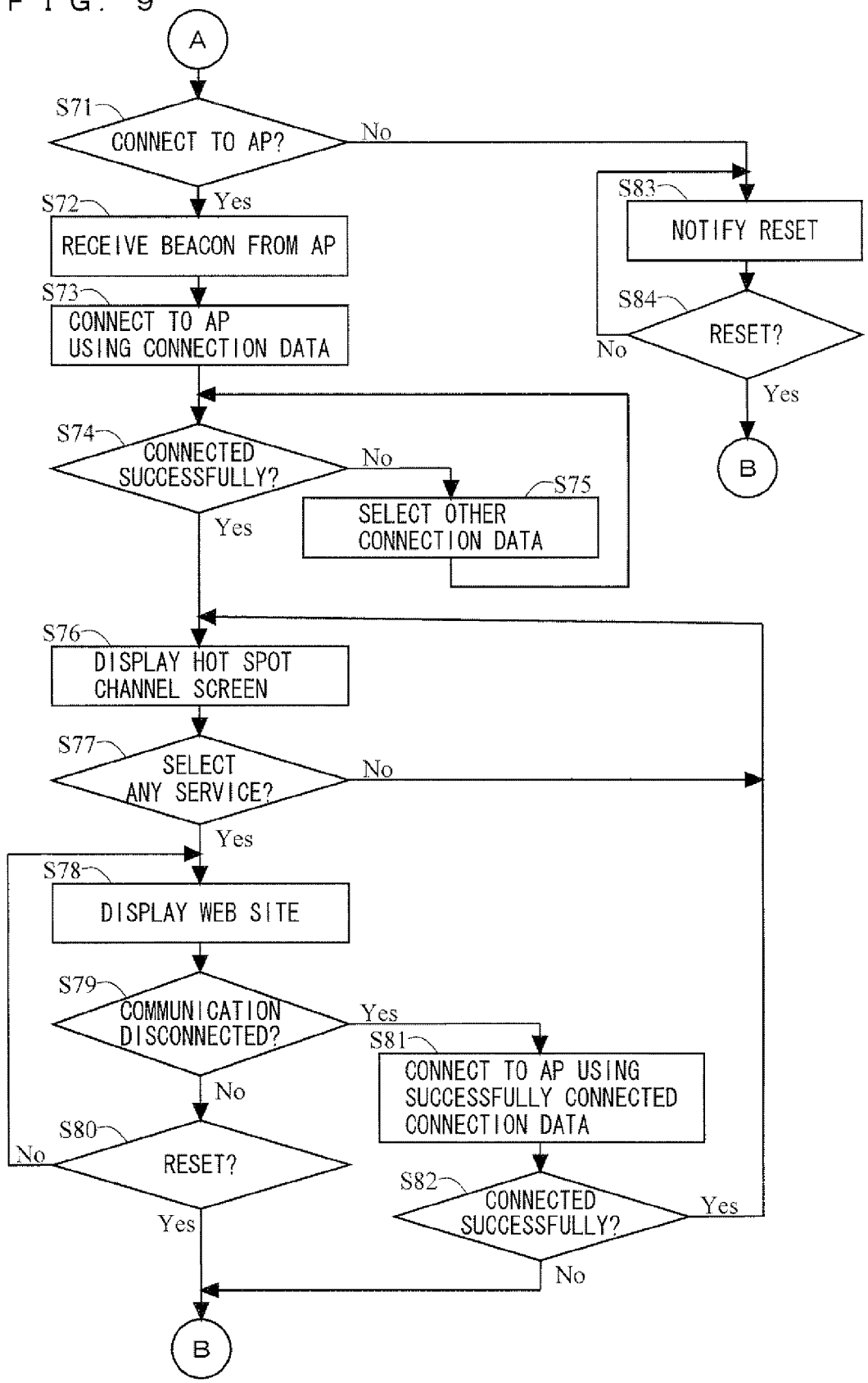
FIG. 9 is a flowchart showing a second half of the information processing performed on the game apparatus 1 by executing the information processing program according to the one embodiment of the present invention.

With reference to FIGS. 8 and 9, a specific processing operation of the information processing program executed on the game apparatus 1 will be described. FIG. 8 is a flowchart showing a first half of the information processing performed on the game apparatus 1 by executing the information processing program. FIG. 9 is a flowchart showing a second half of the information processing performed on the game apparatus 1 by executing the information processing program. The program for executing the information processing is included in the programs stored in the memory card 28 and the memory card 29. The program is read from the memory card 28 or the memory card 29 via the memory card I/Fs 36 when the power of the game apparatus 1 is turned ON, and then executed by the CPU 31.

First, when the power (a power button 14F) of the game apparatus 1 is turned ON (step 51, being abbreviated as "S" in FIGS. 8 and 9), a boot program (not shown) is executed by the CPU 31, and accordingly, the information processing program stored in the memory card 28 or the memory card 29 is loaded onto the main memory 32. The loaded information processing program is executed by the CPU 31 (step 52), whereby processing in step 53 and thereafter is executed.

As shown in FIG. 8, the CPU 31 performs initialization of the information processing (step 53), and proceeds to processing in the subsequent step. For example, as the initialization processing performed in step 53, the CPU 31 initializes respective parameters stored in the main memory 32 to predetermined states. For example, the operation data Da, the connection data Db, and the hot spot channel data Dc are each initialized so as not to include any piece of data. The connection establishment flag included in the connection data Db is initialized to an OFF state.

Next, the CPU 31 performs processing for receiving the connection data from another game apparatus 2 for a predetermined time period (e.g., for two seconds), and determines whether or not the connection data is receivable from another game apparatus 2 (step 54). When the connection data is received from another game apparatus 2, the CPU 31 proceeds to processing in step 61 subsequently. ON the other hand, when the connection data is not received from another game apparatus 2, the CPU 31 proceeds to processing in step 55.

Here, when receiving the connection data from another game apparatus 2, preferably, the game apparatus 1 attempts to receive the connection data by using a so-called passive reception method, which allows the game apparatus 1 to receive a radio wave from another apparatus without outputting a radio wave therefrom. Accordingly, the game apparatus 1 does not automatically outputs a radio wave immediately after the power is turned ON so as to receive the connection data from another apparatus. Therefore, the power of the game apparatus 1 can be turned ON even in a circumstance where an output of an electromagnetic wave is prohibited (e.g., in an airplane).

In step 55, the CPU 31 launches the launcher program, causes the launcher menu to be displayed on the lower LCD 12, and proceeds to processing in the subsequent step. Here, when the launcher menu is displayed on the lower LCD 12, the icon I, which relates to the viewer program (hereinafter referred to as a hot spot viewer) for displaying a content received via the wireless access point 3, is also displayed. Further, in above-described step 55, since the game apparatus 1 does not receive the connection data for establishing connection to the wireless access point 3, the game apparatus 1 cannot establish connection to the wireless access point 3. Therefore, since the game apparatus 1 is not capable of performing processing using the hot spot viewer, the icon I relating to the hot spot viewer is displayed in a non-emphasized manner unlike an emphasized display as shown in FIG. 3. For example, as shown in FIG. 10, supposing the Icon I11 relates to the hot spot viewer, the icon I11 is displayed on the lower LCD 12 in the non-emphasized manner without being distinguished from the other icons I.

In above-described step 55, when the launcher menu is displayed, the CPU 31 refers to flags set with respect to the programs included in the various program group Pa, and determines whether or not the each of the programs is such a program that is designed to execute a procedural step of connecting to the wireless access point 3. With respect to the icon I which relates to the program for executing the procedural step of connecting to the wireless access point 3, the CPU 31 attaches a sign indicative of the program (see the icons I11 and I13 shown in FIG. 10) to the icon I, and displays the icon I with the sign on the lower LCD 12.

Next, the CPU 31 performs processing for receiving the connection data from another game apparatus 2 while displaying the launcher menu, and then determines whether or not the connection data is receivable from another game apparatus 2 (step 56). When the connection data is receivable from another game apparatus 2, the CPU 31 proceeds to processing in step 61 subsequently. On the other hand, when the connection data is yet to be received from the another game apparatus 2, the CPU 31 proceeds to processing in step 57 subsequently.

In step 57, the CPU 31 determines whether or not the user has performed any operation with reference to the operation data Da. When the user has not performed any operation, the CPU 31 returns the processing back to step 55, and continuously performs the processing for displaying the launcher menu in a non-emphasized manner. On the other hand, when the user has performed some operation, the CPU 31 proceeds to processing in step 58 subsequently. In this manner, the CPU 31 intermittently performs the processing for attempting to receive the connection data from another game apparatus 2 (step 56) while displaying the launcher menu in the non-emphasized manner. When the connection data becomes receivable, the CPU 31 changes the processing so as to perform such processing that is performed while connection data is being received (i.e., processing in step 61 and thereafter).

In step 58, the CPU 31 determines whether or not an instruction given by an operation performed by the user is an instruction for selecting execution of an application (e.g., the hot spot viewer) which requires connection to the wireless access point 3. In the case of the instruction for selecting the application which requires connection to the wireless access point 3, the CPU 31 proceeds to processing in step 59 subsequently. On the other hand, in the case of an instruction which does not require connection to the wireless access point 3, the CPU 31 proceeds to processing in step 67 subsequently.

In step 59, the CPU 31 displays, on the lower LCD 12, a screen notifying the user to reset the game apparatus 1. When the user performs an operation to reset the game apparatus 1 (step 60), the CPU 31 returns to step 54 and repeats the processing in accordance with the reset operation. For example, in step 59, a text image stating "No corresponding hot spot is found. Try again in a place where hot spot is available." is displayed on the lower LCD 12, and the user is prompted to reset the game apparatus 1.

On the other hand, in step 67, the CPU 31 performs processing in accordance with an instruction given by the user, and ends the processing in the flowchart. Although various pieces of processing may be performed in step 67 in accordance with the instruction given by the user, details thereof will be omitted here.

When the connection data is received from another game apparatus 2 (Yes in step 54, and Yes in step 56), the CPU 31 obtains the connection data, describes the connection data in the connection data Db (step 61), and then proceeds to processing in the subsequent step. For example, when the connection data is received from another game apparatus 2, the CPU 31 decodes the SSID, the WEP key, and the location ID included in the connection data and describes the SSID, the WEP key, and the location ID having been decoded in the connection data Db by interrelating the SSID, the WEP key and the location ID to one another. Further, a signal strength level when the connection data is received is also detected, and data indicative of the signal strength level is also interrelated to the decoded data and then described in the connection data Db. When a plurality of pieces of the connection data is received from a plurality of another game apparatuses 2, the CPU 31 decodes each piece of the connection data and describes the decoded data in the connection data Db together with its corresponding signal strength level.

As shown in FIG. 7, when the plurality of pieces of the connection data is received from the plurality of another game apparatuses 2, the connection data may be described in order of descending received strength levels. In this case, values of the received strength levels do not need to be described in the connection data Db.

When a new piece of connection data is received from another game apparatus 2, only the new piece of connection data may be described in the connection data Db so as to be added to the data already described therein, or only the new piece of connection data may be described in the connection data Db after all the data already described in the connection data Db is deleted.

Next, the CPU 31 launches the launcher program, causes the launcher menu to be displayed on the lower LCD 12 (step 62), and proceeds to processing in the subsequent step. Here, when the launcher menu is displayed on the lower LCD 12, the icon I relating to the hot spot viewer is also displayed. Since the game apparatus obtains the connection data for establishing connection to the wireless access point 3 in above-described step 62, the game apparatus 1 is capable of establishing connection to the wireless access point 3. Therefore, the game apparatus 1 is capable of performing processing using the hot spot viewer, and the icon I relating to the hot spot viewer is displayed in an emphasized manner. For example, as shown in FIG. 3, if the icon I11 represents an icon relating to the hot spot viewer, the icon I11 is displayed on the lower LCD 12 in an emphasized manner so as to be distinguished from other icons I.

In above-described step 62, when the launcher menu is displayed, the CPU 31 refers to the flags set with respect to the programs included in the various program group Pa, and determines whether or not each of the programs is such a program that is designed to execute a procedural step of connecting to the wireless access point 3. The CPU 31 then displays the icon I, which relates to the program for executing the procedural step of connecting to the wireless access point 3, in an emphasized manner on the lower LCD 12. Further, with respect to the icon I which relates to the program for executing the procedural step of connecting to the wireless access point 3, the CPU 31 attaches the sign indicative of the program (see the icons I11 and I13 shown in FIG. 3) to the icon I, and displays the icon I with the sign on the lower LCD 12. Still further, the CPU 31 displays, on the lower LCD 12, a shape, among the shapes aligned in the slide bar SB, which corresponds to the icon I relating to the program for executing the procedural step of connecting to the wireless access point 3, so as to change between seven colors.

The CPU 31 performs the processing for receiving the connection data from another game apparatus 2, while displaying the launcher menu, and determines whether or not the connection data is receivable from another game apparatus 2 (step 63). When the connection data is not receivable from another game apparatus 2, the CPU 31 deletes the data described in the connection data Db and proceeds to the processing in above described step 55. On the other hand, when the connection data is receivable from another game apparatus 2, the CPU 31 proceeds to processing in step 64 subsequently.

In step 64, the CPU 31 obtains the connection data and describes the same in the connection data Db, and proceeds to processing in the subsequent step. For example, when the connection data obtained in step 64 has an additional piece of connection data which is different from and not included in the connection data obtained in step 61, the CPU 31 may additionally describes only the additional piece of connection data in the connection data Db in the processing in step 64. When the connection data obtained in step 64 is the same as the connection data obtained in step 61, description in the connection data Db does not need to be changed in the processing in step 64.

Next, the CPU 31 determines whether or not the user is performed an operation with reference to the operation data Da (step 65). When the user has not performed any operation, the CPU 31 returns the processing to step 62, and continuously performs the processing for displaying the launcher menu in an emphasized manner. On the other hand, when the user has performed some operation, the CPU 31 proceeds to processing in step 66 subsequently. In this manner, the CPU 31 intermittently performs processing for determining whether or not reception of the connection data from another game apparatus 2 is interrupted (step 63) while displaying the launcher menu in the emphasized manner. When the reception is interrupted and the connection data is not receivable, the CPU 31 changes the processing so as to perform such processing that is performed when the connection data is not receivable (i.e., the processing in step 55 and thereafter).

In step 66, the CPU 31 determines whether or not an instruction given by an operation by the user is an instruction for selecting execution of an application (e.g., the hot spot viewer) which requires connection to the wireless access point 3. In the case of the instruction for selecting the application which requires connection to the wireless access point 3, the CPU 31 proceeds to processing in step 71 (FIG. 9) subsequently. On the other hand, in the case of an instruction which does not require connection to the wireless access point 3, the CPU 31 proceeds to processing in step 67.

With reference to FIG. 9, in step 71, in order to ask the user whether or not to connect to the wireless access point 3, the CPU 31 displays, on the lower LCD 12, such a display that prompts the user to perform an input indicative of execution/ non-execution of the connection. When the user performs an input indicative of execution of the connection to the wireless access point 3 (Yes in step 71), the CPU 31 proceeds to processing in step 72 subsequently, with reference to the operation data Da. On the other hand, when the user performs an input indicative of non-execution of the connection to the wireless access point 3 (No in step 71), the CPU 31 proceeds to processing in step 83 subsequently.

In step 72, the CPU 31 receives a beacon which is transmitted from the wireless access point 3 at regular intervals via the wireless communication module 38 so as to establish synchronization of a wireless network. Using information included in the received beacon and the connection data described in the connection data Db, the CPU 31 attempts to establish connection to the wireless access point 3 via the wireless communication module 38 (step 73). When a plurality of pieces of connection data is described in the connection data Db, the CPU 31 attempts to establish connection to the wireless access point 3 using a piece of the connection data which has the strongest received strength level.

Next, the CPU 31 determines whether or not connection to the wireless access point 3 has been established successfully (step 74). When the connection to the wireless access point 3 has failed, the CPU 31 selects another piece of the connection data described in the connection data Db (step 75), and attempts to establish reconnection to the wireless access point 3 using the another piece of the connection data and the information included in the above-described beacon. On the other hand, when the connection to the wireless access point 3 has been established successfully, the CPU 31 sets the connection establishment flag ON with respect to the connection data with which the connection has been established, updates the connection data Db, and then proceeds to processing in step 76 subsequently.

In step 76, the CPU 31 stores data, which is obtained from a predetermined server on the network via the wireless access point 3, in the hot spot channel data Dc, and displays a screen based on the data on the lower LCD 12 and/or the upper LCD 22. The CPU 31 then proceeds to processing in the subsequent step.

For example, when the CPU 31 has established the connection to the server using the hot spot viewer, the server transmits data corresponding to a location ID, which is used for establishing the connection, to the game apparatus 1. For example, when another game apparatus 2 and the wireless access point 3 are situated in a certain shop, the server transmits, to the game apparatus 1, data such as a name of the shop corresponding to the location ID, a list of services provided by the shop (e.g., viewable websites, downloadable programs, and the like), file URLs (Uniform Resource Locators) indicated by icons corresponding to the respective services, connection point addresses when the respective icons are selected, and the like. Using the data received from the server, the game apparatus 1 displays the icons indicative of the services provided by the shop on the lower LCD 12 so as to prompt the user to select any of the services (a hot spot channel screen). FIG. 11 shows an exemplary case where another game apparatus 2 and the wireless access point 3 are located in a shop A, and icons Ism1 and Ism2 indicative of a service menu 1 and a service menu 2, respectively, which are provided by the shop A, are displayed on the lower LCD 12.

Next, the CPU 31 refers to the operation data Da until the user selects one of the provided services (step 77). When the user has selected one of the provided services (Yes in step 77), the CPU 31 proceeds to processing in step 78 subsequently.

In step 73, the CPU 31 displays a WEB (World Wide Web) site corresponding to the service selected by the user on the lower LCD 12 and/or the upper LCD 22. For example, the CPU 31 refers to the hot spot channel data Dc, obtains a connection point address corresponding to the icon Ism1 or Ism2 selected by the user, and establishes connection to the WEB site using the connection point address. The CPU 31 then proceeds to processing in the subsequent step.

Next, the CPU 31 monitors whether or not communication with the wireless access point 3 is disconnected while the user is viewing the website (step 79) and also monitors whether or not the user has performed the reset operation (step 80). When the communication with the wireless access point 3 is disconnected (Yes in step 79), the CPU 31 attempts to establish reconnection to the wireless access point 3 using the connection data with which the most recent connection was established (step 81). The CPU 31 refers to the connection data Db, and uses the connection data, with respect to which the connection establishment flag is set ON, as the connection data with which the most recent connection was established. When the reconnection to the wireless access point 3 has been established successfully (Yes in step 82), the CPU 31 returns to step 76 and repeats the processing. On the other hand, when the reconnection to the wireless access point 3 has failed (No in step 82), or when the user performs the reset operation (Yes in step 80), the CPU 31 deletes the data described in the connection data Db and returns to step 54 and repeats the processing.

On the other hand, when the user performs an input indicative of non-execution of the connection to the wireless access point 3 (No in step 71), the CPU 31 displays, on the lower LCD 12, a screen notifying the user to reset the game apparatus 1 (step 83). When the user performs the operation to reset the game apparatus 1 (step 84), the CPU 31 deletes the data described in the connection data Db, returns to step 54 and repeats the processing in accordance with the reset operation. For example, in above-described step 83, a text image stating that "Hot spot channel is not available unless Internet connection is established." is displayed on the lower LCD 12, and the user is prompted to reset the game apparatus 1.

In this manner, only when the game apparatus 1 according to the present embodiment receives the connection data from another game apparatus 2, the game apparatus 1 is capable of establishing connection to and communicate with the wireless access point 3 by using the connection data. Therefore, it is possible to prevent the game apparatus 1 from establishing connection to another wireless access point other than the wireless access point 3, or from being connected to another wireless access point. Further, it is also possible to cause the game apparatus 1 to establish connection to the wireless access point 3 as a connection point apparatus specified by the connection data.

In the above description, the display form of the icon I relating to the application which has become usable when the connection data is obtained, is changed by changing the color of the upper and lower sides of a frame thereof between seven colors. However, the display form of the icon I does not need to be changed in order to realize the present invention.

In the above-described specific processing operation caused by the information processing program, the examples have been described in which only when the game apparatus 1 is capable of receiving the connection data from another game apparatus 2, an application which becomes usable upon obtainment of the connection data has become executable. Accordingly, when the game apparatus 1 is located within an area in which the connection data transmitted from the another game apparatus 2 is receivable and also within an area in which connection to the wireless access point 3 can be established, it is possible to execute an application which becomes usable upon obtainment of the connection data.

However, the application may be made executable even if the game apparatus 1 is in another state. For example, when the game apparatus 1 has received the connection data from another game apparatus 2, the received connection data is stored on the game apparatus 1 until the power of the game apparatus 1 is turned OFF. When the power of the game apparatus 1 is turned OFF, the connection data is deleted. While the above-described connection data is stored, the application, which becomes usable upon obtainment of the connection data, is made executable. Accordingly, even if an area in the connection data transmitted from another game apparatus 2 is receivable is not overlapped with an area in which connection to the wireless access point 3 can be established, the game apparatus 1 is able to establish connection to the wireless access point 3 in such a non-overlapped area as long as the game apparatus 1 has once received the connection data.

The above description is exemplified by the game apparatus 1 which has a configuration in which various programs such as the viewer program for displaying a content received by establishing connection to the wireless access point 3, and the launcher application software for displaying a list of the icons I are stored in the memory in advance. However, at least one of the programs may be obtained externally. For example, at least one of the programs may be obtained from the memory cards 28 and/or 29, and may be obtained from another apparatus through communication with the another apparatus.

For example, when the viewer program is obtained from another apparatus through communication therewith, another game apparatus 2 transmits the viewer program as well as the connection data by wireless broadcasting. The game apparatus 1 receives the viewer program transmitted from another game apparatus 2, installs the viewer program, and then receives the above-described connection data, thereby executing processing thereafter. Specifically, the viewer program transmitted from another game apparatus 2 is obtained by using a protocol dedicated to the game apparatuses performing transmission therebetween. Accordingly, even in the case where a game apparatus in which various programs have not been installed in advance and the game apparatus 1 in which various programs have been installed in advance are present in a mixed manner, both of the game apparatus and the game apparatus 1 are, respectively, capable of performing processing for establishing connection to the wireless access point 3.

In this case, another game apparatus 2 may obtain the viewer program to be distributed to the game apparatus 1 via the wireless LAN. Accordingly, the viewer program to be distributed to the game apparatus 1 may be easily updated and it is possible perform processing by using a latest viewer program consistently.

Further, the above description is exemplified by the case where the connection data such as the SSID and the WEP key is transmitted from another game apparatus 2, however, an apparatus transmitting the connection data is not limited to the game apparatus. For example, the connection data may be wirelessly broadcasted at regular intervals from a dedicated terminal or a versatile terminal which transmits the connection data.

Further, in the above description, the connection point apparatus has been exemplified by a system using the wireless access point 3 in which the game apparatus 1 is connected to the wireless access point 3. However, another apparatus may be used as the connection point apparatus of the present invention. For example, although the wireless access point 3 functions as an intermediary apparatus to establish connection to the network, connection may be established only between the game apparatus 1 and the connection point apparatus of the present invention. For example, as the connection point apparatus, another game apparatus, which is different from the game apparatus 1, is arranged, and connection may be established directly between the game apparatuses.

When the user has selected the icon I relating to an application which is not useable since the connection data is not obtained, (Yes in step 58 shown in FIG. 8), in addition to a display of a screen on the lower LCD 12 so as to notify the user to reset the game apparatus 1, an explanation (tutorial) of a method for using the application and functions of the application may be displayed. Accordingly, the user can understand the method for using the above-described hot spot viewer, the reason why the display form of the icon I is changed, and the like.

In the above-described specific processing operation caused by the information processing program, the case has been described where when the user has selected a service displayed on the hot spot channel (Yes in step 77 shown in FIG. 9), a WEB site corresponding to the service is provided and displayed. However, the service may be provided in a different form. For example, in the case where the above-described service is provided in a form of a native application or the like, and the user has selected the service displayed on the hot spot channel, then the native application corresponding to the service may be downloaded to the game apparatus 1 via the wireless access point 3.

Further, in the above description, the SSID is used as an example of the identifier for establishing connection to the wireless access point 3, the identifier being included in the connection data transmitted from another game apparatus 2. However, an identifier which is different from the SSID may be included in the connection data. For example, an identification number such as a MAC address (Media Access Control address) which is unique to each wireless access point 3 may be included in the connection data in combination with the SSID or instead of the SSID.

Further, in the embodiment described above, as an example of a LCD display section having two screens, the case has been described where the lower LCD 12 and the upper LCD 22 physically separated from each other are arranged one above the other (the case of two screens above and below). However, a configuration of a display section having two screens may be another configuration. For example, the lower LCD 12 and the upper LCD 22 may be arranged on a main surface of the lower housing 11 laterally side by side. Alternatively, a vertically long LCD having the same width as the lower LCD 12 and having a vertical length which is twice as large as the that of the lower LCD 12 (namely, an LCD which is physically one unit and has a display size with a vertical length equal to a sum of vertical lengths of two screens) may be provided in the main surface of the lower hosing 11, and the above two images (namely, a display image obtained by changing a taken image to a monochrome image, and an image showing an operation explanation screen) may be displayed one above the other (displayed so as to be adjacent to each other without a boundary portion between the above and below). Still alternatively, a horizontally long LCD having the same vertical length as the lower LCD 12 and having a width which is twice as large as that of the lower LCD 12 may be provided in the main surface of the lower housing 11, and the two game images may be displayed laterally side by side (displayed so as to be adjacent to each other without a boundary portion between left and right). In other words, a physically one screen may be divided into two and used to display two images. In either form of an image, if the touch panel 13 is provided on a screen on which the display image displayed on the lower LCD 12 is displayed, the present invention can be realized similarly. Alternatively, in the case where the physically one screen is divided into two and used to display the two images, the touched panel 13 may be provided on an entirety of the screen.

Further, in the embodiment described above, the game apparatus 1 is provided integrally with the touch panel 13. However, even if the game apparatus and the touch panel may be provided independently of each other, it should be understood that the present invention can be realized. Alternatively, the touch panel 13 may be provided on an upper surface of the upper LCD 22, and the display image displayed on the lower LCD 12 may be displayed on the upper LCD 22. Further, although the two display screens (the lower LCD 12 and the upper LCD 22) are provided in the above embodiment, only one display screen may be provided. In other words, in the above embodiment, the upper LCD 22 is not provided, but only the lower LCD 12 may be provided as a display screen, and the touch panel 13 may be provided on the lower LCD 12. Still alternatively, in the above embodiment, without having the lower LCD 12, the touch panel 13 may be provided on the surface of the upper LCD 22, and the display image displayed on the lower LCD 12 may be displayed on the upper LCD 22.

Further, in the embodiment described above, as input means of the game apparatus 1 for realizing a coordinate input, the touch panel 13 is used. However, another pointing device may be used. Here, the pointing device is an input device for designating an input position or a coordinate point on a screen, and, for example, a mouse, a trackpad, a trackball, or the like is used as the input device. When position information on a screen coordinate system calculated from an output value outputted from the input device is used, the present invention can be realized similarly.

Further, in the case of a stationary game apparatus whose game controller is held by a player while a game is played, a pointing device in another form is considered. For example, a camera fixed to a housing of the game controller can be used as the pointing device. In this case, in accordance with change in a position at which the housing of the game controller is pointed, an image taken by the camera is changed. Thus, by analyzing the taken image, a coordinate point at which the housing is pointed with respect to a display image can be calculated.

Further, the above embodiment has been described using the hand-held game apparatus 1 and the stationary game apparatus. However, the present invention may be realized by an information processing apparatus, such as a common personal computer, by executing the information processing program of the present invention.

Further, the shape of the above game apparatus 1, and the shapes, numbers, and installed positions of the operation buttons 14 and the touch panel 13 provided therein are merely examples, and the present invention can be realized with other shapes, numbers and installed positions. Further, an execution order or the like of the respective steps used in the above-described information processing is merely an example, and the present invention can be realized with another execution order.

Further, in the embodiment described above, whether or not each of the plurality of application programs requires connection to the wireless access point is determined in accordance with the flag set thereon, and the display form of the icons relating to the applications is changed accordingly. However, a display form of icons relating to such applications that are specified in advance (which include programs executing a procedural step of connecting to the wireless access point) may be changed. In this case, determination based on the flag is not necessary.

The data communication system, the information processing apparatus, and the storage medium having stored thereon the information processing program of the present are capable of establishing connection to a specific connection point apparatus, are useful for a system for communicating with a connection point apparatus such as a wireless access point, apparatus included in the system or the like, and are also useful as a program or the like which is executed on the apparatus.

While example embodiments of the invention have been described in detail, the foregoing description is in all aspects illustrative and not restrictive. It is understood that numerous other modifications and variations can be devised without departing from the scope of the invention.

What is claimed is:

1. A data communication system including a first communication terminal, a second communication terminal and a connection point apparatus,
    the first communication terminal comprising connection point data transmitter which reads connection point data, configured to allow connection to a specific connection point apparatus and stored in a memory of the first communication terminal, from the memory and transmits the connection point data for allowing connection with the connection point apparatus,
    the second communication terminal comprising:
        connection point data receiver for receiving the connection point data stored in the first communication terminal and transmitted from the first communication terminal; and
        communication unit for attempting to connect with the connection point apparatus by using the connection point data received by the connection point data receiver from the first communication terminal.

2. The data communication system according to claim 1, wherein
    the connection point data at least includes data indicative of an identifier for identifying the connection point apparatus, and
    the communication unit attempts to connect with the connection point apparatus by using the data indicative of the identifier included in the connection point data.

3. The data communication system according to claim 2, wherein
    the connection point apparatus is a wireless access point, and
    the identifier is an SSID (Service Set Identifier).

4. The data communication system according to claim 2, wherein
    the connection point apparatus is a wireless access point, and
    the identifier is a MAC address (Media Access Control address).

5. The data communication system according to claim 2, wherein
    data communicated between the connection point apparatus and the second communication terminal is encoded by using a key,
    the connection point data further includes data indicative of the key, and the communication unit attempts to connect with the connection point apparatus by using the identifier included in the connection point data and the data indicative of the key.

6. The data communication system according to claim 1, wherein
the connection point apparatus is a wireless access point which transmits, at regular intervals, a beacon including data for establish synchronization of a wireless network,
the second communication terminal further includes beacon receiver for receiving the beacon transmitted from the connection point apparatus, and
the communication unit attempts to connect with the connection point apparatus by using data included in the beacon received by the beacon receiver and the connection point data received by the connection point data receiver.

7. The data communication system according to claim 1, wherein the connection point data receiver attempts to receive the connection point data by using a dedicated protocol which is at least installed on each of the first communication terminal and the second communication terminal.

8. The data communication system according to claim 1, wherein the connection point data receiver receives the connection point data without outputting an radio wave therefrom when the second communication terminal is started.

9. The data communication system according to claim 1, wherein
the second communication terminal further includes launcher unit for prompting a user to select an application program to be launched from among a plurality of application programs, and for launching the selected application program, and
when the connection point data receiver has received the connection point data, the launcher unit notifies the user that a connection application program is executable, the connection application program including a program for causing the second communication terminal to execute a procedural step of connecting to the connection point apparatus.

10. The data communication system according to claim 9, wherein the connection application program is a viewer program for establishing connection to a network via the connection point apparatus.

11. The data communication system according to claim 9, wherein the connection point data receiver attempts to receive the connection point data after the second communication terminal is started until before the launcher unit becomes capable of receiving a selection operation performed by the user.

12. The data communication system according to claim 11, wherein the connection point data receiver continuously attempts to receive the connection point data after the second communication terminal is started and even after the launcher unit becomes capable of receiving the selection operation performed by the user.

13. The data communication system according to claim 1, further comprising
a third communication terminal, wherein
the third communication terminal includes:
application receiver for downloading a connection application program including a program for causing the third communication terminal to execute a procedural step of connecting to the connection point apparatus, and for installing the connection application program onto the third communication terminal;
connection point data receiver for attempting to receive the connection point data from the first communication terminal; and
communication unit for attempting to connect with the connection point apparatus by using the connection point data received by the connection point data receiver when the connection application program is executed.

14. The data communication system according to claim 13, wherein the connection application program is a viewer program for establishing connection to a network via the connection point apparatus.

15. The data communication system according to claim 13, wherein the application receiver downloads the connection application program by using a dedicated protocol which is at least installed on each of the first communication terminal and the third communication terminal.

16. The data communication system according to claim 1, wherein
the connection point data further includes data for specifying a predetermined content, and
the communication unit communicates with the connection point apparatus, and obtains, via a network, the content which is specified by the data for specifying the predetermined content.

17. The data communication system according to claim 16, wherein
the second communication terminal further includes icon display controller for obtaining an icon relating to the content from a server on the network, and for displaying the icon on a display device so as to prompt the user to select the icon, and
the communication unit obtains, via the network, the content relating to the icon selected by an operation performed by the user.

18. The data communication system according to claim 1, wherein
the second communication terminal further includes:
connection point data storage unit for storing the connection point data received by the connection point data receiver until the second communication terminal is shut down, and
reconnection unit for attempting to reconnect to the connection point apparatus in accordance with the connection point data stored in the connection point data storage unit when connection to the connection point apparatus is established and then interrupted.

19. The data communication system according to claim 1, wherein
the second communication terminal further includes received strength level detector for detecting a received strength level when the connection point data is received from the first communication terminal,
when the connection point data receiver has received a plurality of pieces of the connection point data, the communication unit successively selects a piece of the connection point data, from among the plurality of pieces of the connection point data, in order of descending received strength level, and attempts to connect with the connection point apparatus.

20. The data communication system according to claim 1, wherein
the communication unit attempts to connect with the connection point apparatus by using the connection point data which is being received by the connection point data receiver.

21. The data communication system according to claim 1, wherein
the second communication terminal further includes connection point data storage unit for storing the connection point data received by the connection point data receiver until the second communication terminal is shut down, and
the communication unit attempts to connect with the connection point apparatus by using the connection point data stored in the connection point data storage unit.

22. The data communication system according to claim 1, wherein the memory is a non-volatile storage memory capable of storing the connection point data.

23. The data communication system according to claim 1, wherein the memory is a volatile storage memory capable of storing the connection point data.

24. An information processing apparatus for communicating with a connection point apparatus, comprising:
connection point data receiver for receiving connection point data, configured to allow connection to a specific connection point apparatus, which is stored in a memory and read from the memory of another communication terminal and is transmitted from the another communication terminal and which is used for allowing connection with the connection point apparatus; and
communication unit for attempting to connect with the connection point apparatus by using the connection point data received by the connection point data receiver from the another communication terminal.

25. A non-transitory computer-readable storage medium having stored thereon an information processing program executed on a computer of an information processing apparatus which communicates with a connection point apparatus, the information processing program cause the computer to perform functionality comprising:
connection point data receiver for receiving connection point data, configured to allow connection to a specific connection point apparatus, which is stored in a memory and read from the memory of another communication terminal and is transmitted from the another communication terminal and which is used for allowing connection with the connection point apparatus; and
communication unit for attempting to connect with the connection point apparatus by using the connection point data received by the connection point data receiver from the another communication terminal.

26. A method performed by a communication terminal, the method comprising:
receiving connection point data, configured to allow connection to a specific connection point apparatus, which is stored in a memory and read from the memory of another communication terminal and is transmitted from the another communication terminal and which is used for allowing connection with the connection point apparatus; and
attempting to connect with a connection point apparatus by using the received connection point data received from the another communication terminal.

27. A communication terminal for communicating with a connection point apparatus, the communication terminal comprising:
a processing system, having one or more processors, the processing system configured to:
receive connection point data, configured to allow connection to a specific connection point apparatus, which is stored in a memory and read from the memory of another communication terminal and is transmitted from the another communication terminal and which is used for allowing connection with the connection point apparatus; and
attempt to connect with the connection point apparatus by using the received connection point data received from the another communication terminal.

* * * * *